US009665929B2

(12) United States Patent
Matsumoto

(10) Patent No.: US 9,665,929 B2
(45) Date of Patent: May 30, 2017

(54) IMAGE PROCESSING APPARATUS, IMAGE PROCESSING METHOD, AND IMAGE PROCESSING PROGRAM

(71) Applicant: SAMSUNG DISPLAY CO., LTD., Yongin-si, Gyeonggi-Do (KR)

(72) Inventor: Kazuhiro Matsumoto, Yokohama (JP)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 30 days.

(21) Appl. No.: 14/925,335

(22) Filed: Oct. 28, 2015

(65) Prior Publication Data

US 2016/0117807 A1 Apr. 28, 2016

(30) Foreign Application Priority Data

Oct. 28, 2014 (JP) ................................. 2014-219270

(51) Int. Cl.
 *G06K 9/40* (2006.01)
 *G06T 5/00* (2006.01)
(52) U.S. Cl.
 CPC ............ *G06T 5/008* (2013.01); *G06T 5/002* (2013.01); *G06T 2207/20012* (2013.01); *G06T 2207/20192* (2013.01); *G06T 2207/20208* (2013.01)
(58) Field of Classification Search
 None
 See application file for complete search history.

(56) References Cited

U.S. PATENT DOCUMENTS

| 5,936,684 | A  | * | 8/1999  | Murayama | H04N 5/20 348/671 |
| 5,974,158 | A  | * | 10/1999 | Auty     | G06K 9/3241 382/103 |
| 6,137,541 | A  | * | 10/2000 | Murayama | H04N 5/20 348/671 |
| 7,127,122 | B2 | * | 10/2006 | Ogata    | G06T 5/002 382/260 |
| 7,697,782 | B2 | * | 4/2010  | Pan      | H04N 19/60 382/260 |

(Continued)

FOREIGN PATENT DOCUMENTS

| EP | 2187620   | 5/2010 |
| JP | 10-191044 | 7/1998 |

(Continued)

*Primary Examiner* — Feng Niu
(74) *Attorney, Agent, or Firm* — F. Chau & Associates, LLC

(57) ABSTRACT

An image processing device includes a generation unit and a smoothing processor. The generation unit calculates an edge strength on the basis of a stairs tone strength indicative of differences between a first parameter and a second parameter. The first parameter is a first gradient based on pixel values of a pixel of interest in an input image and adjacent pixels included in a first range with respect to the pixel of interest. The second parameter is one of a variance based on pixel values of the pixel of interest and the adjacent pixels, and a second gradient based on the pixel value of the pixel of interest and adjacent pixels included in a second range. The smoothing processor performs a nonlinear smoothing operation on the pixel value of the pixel of interest and the adjacent pixels included in the first range on the basis of the calculated edge strength.

20 Claims, 17 Drawing Sheets

(56) References Cited

U.S. PATENT DOCUMENTS

| | | | | |
|---|---|---|---|---|
| 7,894,685 | B2* | 2/2011 | Zhai | G06K 9/3266 375/240.26 |
| 8,149,299 | B2* | 4/2012 | Ohwaki | G06T 5/004 348/222.1 |
| 8,150,202 | B2* | 4/2012 | Mohanty | G06T 5/009 358/3.26 |
| 8,406,527 | B2* | 3/2013 | Kido | G06K 9/6202 382/189 |
| 8,411,979 | B2* | 4/2013 | Zhao | H04N 1/409 358/3.27 |
| 8,417,064 | B2* | 4/2013 | Wakazono | G06T 5/008 382/167 |
| 8,483,515 | B2* | 7/2013 | Matsunobu | G06T 3/403 382/148 |
| 8,842,741 | B2* | 9/2014 | Schoner | H04N 19/86 375/240.27 |
| 9,305,335 | B2* | 4/2016 | Choi | H04N 1/6027 |
| 2008/0292194 | A1* | 11/2008 | Schmidt | G06T 7/0012 382/217 |
| 2009/0245679 | A1* | 10/2009 | Ohwaki | G06T 5/20 382/260 |
| 2010/0303372 | A1* | 12/2010 | Zhao | H04N 1/409 382/254 |
| 2011/0123133 | A1 | 5/2011 | Mohanty et al. | |
| 2012/0194783 | A1* | 8/2012 | Wei | A61B 3/102 351/206 |
| 2015/0117775 | A1* | 4/2015 | Abe | G09G 5/02 382/167 |
| 2016/0248991 | A1* | 8/2016 | Matsumoto | H04N 5/142 |

FOREIGN PATENT DOCUMENTS

| | | |
|---|---|---|
| JP | 2003008935 | 1/2003 |
| JP | 2007-048104 | 2/2007 |
| JP | 2009238009 | 10/2009 |

* cited by examiner

IMAGE PROCESSING APPARATUS, IMAGE PROCESSING METHOD, AND IMAGE PROCESSING PROGRAM

CROSS-REFERENCE TO RELATED APPLICATIONS

This U.S. non-provisional patent application claims priority under 35 U.S.C. §119 from, and the benefit of, Japanese Patent Application No. 2014-219270, filed on Oct. 28, 2014, the contents of which are herein incorporated by reference in their entirety.

BACKGROUND

Embodiments of the present disclosure are directed to an image processing device, an image processing method, and an image processing program.

Digital still cameras frequently make use of dynamic range compression technologies such as high dynamic range (HDR) or backlight compensation. Such imaging devices can compress a range of one or both of a highlight area and a shadow area of an image of a subject for which a brightness range is wider than the dynamic range of an imaging element, to acquire an image.

Furthermore, in an image having a partially compressed brightness range, image processing based on retinex theory can be performed on the image to provide local dynamic range compensation. According to retinex theory, brightness components of an input image are divided into illumination light components and reflectivity components, the illumination light components are modulated, and then the modulated illumination components and the reflectivity components are recombined, to obtain an output image in which dynamic range has been locally compensated.

In addition, a smoothing filter may be applied to the input image to extract the illumination light components. In this case, an unnatural image pattern not present in the original image may form in the vicinity of a boundary between a subject and a background, i.e., a halo phenomenon.

SUMMARY

Embodiments of the present disclosure can provide an image processing device, an image processing method, and a program for differentiating a boundary between a background and a subject, referred to as a "stairs tone edge" from a boundary in which contrast (gradation) changes due to a a subject's shape, referred to as a "pattern tone edge", in an input image to perform a nonlinear smoothing operation on the image.

An embodiment of the inventive concept provides an image processing device that includes a generation unit that calculates an edge strength based on a stairs tone strength indicative of differences between a first parameter and a second parameter, where the first parameter is a first gradient based on pixel values of a pixel of interest in an input image and adjacent pixels included in a first range with respect to the pixel of interest, the second parameter is one of a variance based on pixel values of the pixel of interest and the adjacent pixels and a second gradient based on pixel values of the pixel of interest and adjacent pixels included in a second range wider than the first range, and a smoothing processor that performs a nonlinear smoothing operation on the pixel values of the pixel of interest and the adjacent pixels included in the first range, based on the calculated edge strength.

In an embodiment, the generation unit may calculate the variance as the second parameter, and may calculate the stairs tone strength $K_S$ based on $$K_S = k \cdot \frac{\nabla^2}{\sigma^2},$$

where $\nabla$ denotes the first parameter, $\sigma^2$ denotes the second parameter, and k denotes a compensation coefficient where the variance is calculated based on the pixel of interest and adjacent pixels included in a second range wider than the first range.

In an embodiment, the generation unit may calculate a standard deviation as the second parameter based on the variance, and may calculate the stairs tone strength $K_S$ based on $$K_S = k \cdot \frac{|\nabla|}{\sigma},$$

where $\nabla$ denotes the first parameter, $\sigma$ denotes the second parameter, and k denotes a compensation coefficient.

In an embodiment, the generation unit may calculate the variance as the second parameter, and may calculate the stairs tone strength $K_S$ based on $K_S = k_\sigma \cdot \sigma^2 - k_\nabla \cdot \nabla^2$, where $\nabla$ denotes the first parameter, $\sigma^2$ denotes the second parameter, $k_\nabla$ denotes a compensation coefficient for the first parameter, and $k_\sigma$ denotes a compensation coefficient for the variance.

In an embodiment, the generation unit may calculate the first gradient by applying a band limiting filter having a first pass frequency range, and may calculate the second gradient by applying a band limiting filter having a second pass frequency range that is centered about a lower frequency than the frequency center of the first pass frequency range.

In an embodiment, the generation unit may calculate the second gradient as the second parameter, and may calculate the stairs tone strength $K_S$ based on $$K_S = \frac{\nabla_1}{\nabla_2},$$

where $\nabla 1$ denotes the first parameter, and $\nabla 2$ denotes the second parameter.

In an embodiment, the generation unit may calculate the second gradient as the second parameter, and may calculate the stairs tone strength $K_S$ based on $K_S = |\nabla_2| - |\nabla_1|$, where $\nabla 1$ denotes the first parameter, and $\nabla 2$ denotes the second parameter.

In an embodiment, the generation unit may calculate the edge strength by multiplying an absolute value of the first parameter by the stairs tone strength.

In an embodiment, the generation unit may calculate the edge strength by multiplying a square of the first parameter by the stairs tone strength.

In an embodiment, the smoothing processor may determine an ε value based on the edge strength, and may perform the nonlinear smoothing operation based on an adaptive ε filter according to the ε value.

In an embodiment, the smoothing processor may determine the ε value based on a result of comparison between the edge strength and a predetermined threshold value.

In an embodiment, the smoothing processor may determine the ϵ value to be a minimum value if the edge strength exceeds the threshold value, and may determine the ϵ value to be a maximum value if the edge strength is less than or equal to the threshold value.

In an embodiment of the inventive concept, an image processing method includes calculating an edge strength based on a stairs tone strength indicative of differences between a first parameter and a second parameter, the first parameter being a first gradient based on pixel values of a pixel of interest in an input image and adjacent pixels included in a first range with respect to the pixel of interest, the second parameter being one of a variance based on pixel values of the pixel of interest and the adjacent pixels and a second gradient based on pixel values of the pixel of interest and adjacent pixels included in a second range wider than the first range, and performing a nonlinear smoothing operation on the pixel values of the pixel of interest and the adjacent pixels included in the first range, based on the calculated edge strength.

In an embodiment, the edge strength may be calculated from the first parameter and the stairs tone strength, and the method may further comprise determining an ϵ value based on the edge strength, wherein the nonlinear smoothing operation is based on an adaptive ϵ filter based on the ϵ value.

In an embodiment, the variance may be the second parameter and the stairs tone strength may be calculated based on one of $$K_S = k \cdot \frac{\nabla^2}{\sigma^2}, K_S = k \cdot \frac{|\nabla|}{\sigma},$$

or $K_S = k_\sigma \cdot \sigma^2 - k_\nabla \cdot \nabla^2$, wherein $\nabla$ denotes the first parameter, $\sigma^2$ denotes the second parameter, k denotes a compensation coefficient, $k_\nabla$ denotes a compensation coefficient for the first parameter, and $k_\sigma$ denotes a compensation coefficient for the second parameter.

In an embodiment, the second gradient may be the second parameter, and the stairs tone strength may be calculated based on one of $$K_S = \frac{\nabla_1}{\nabla_2}$$

or $K_S = |\nabla_2| - |\nabla_1|$, wherein $\nabla 1$ denotes the first parameter, and $\nabla 2$ denotes the second parameter.

In an embodiment of the inventive concept, a non-transitory recording medium stores a program for instructing a computer to perform method for processing an image. The method includes, calculating an edge strength based on a stairs tone strength indicative of differences between a first parameter and a second parameter, the first parameter being a first gradient based on pixel values of a pixel of interest in an input image and of adjacent pixels included in a first range with respect to the pixel of interest, the second parameter being one of a variance based on pixel values of the pixel of interest and of the adjacent pixels and a second gradient based on pixel values of adjacent pixels included in a second range wider than the first range, and performing a nonlinear smoothing operation on pixel values of the pixel of interest and the adjacent pixels included in the first range, based on the calculated edge strength.

DETAILED DESCRIPTION

Figure 1:
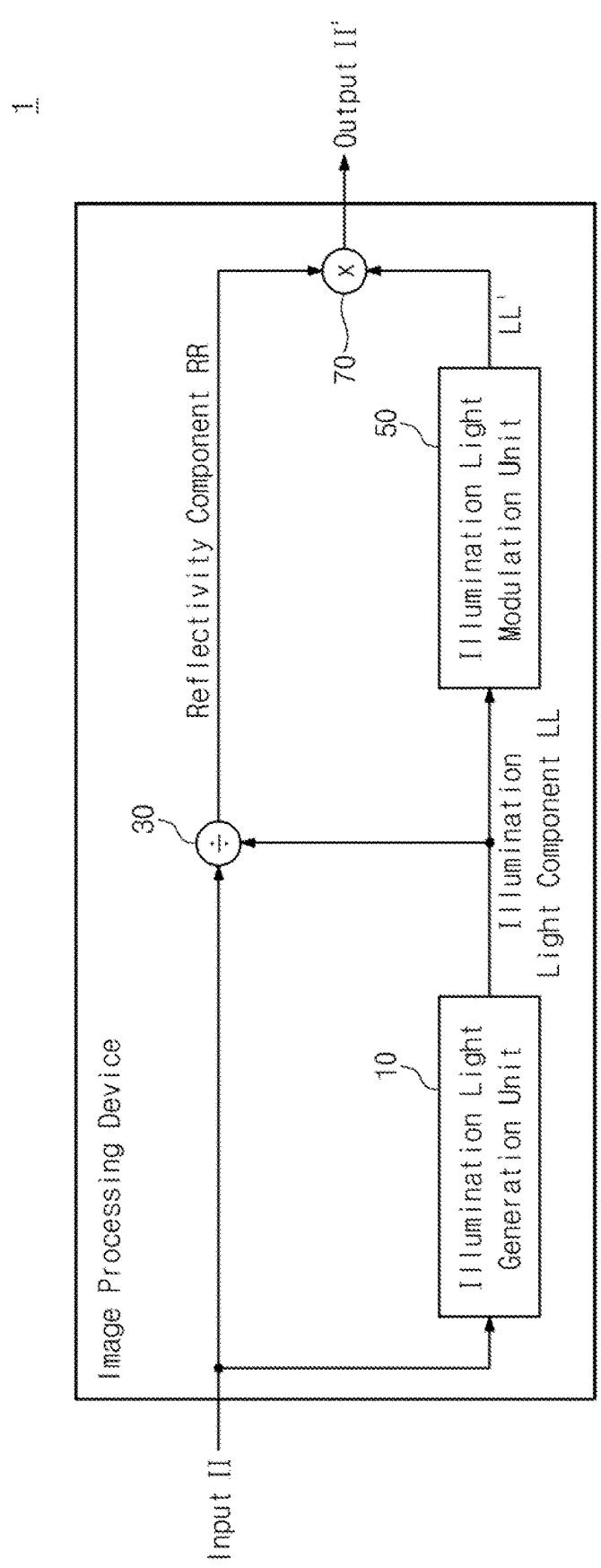
FIG. 1 is a block diagram of an exemplary configuration of an image processing device according to an embodiment of the inventive concept.

Exemplary embodiments of the inventive concept will be described in detail with reference to the accompanying drawings. In the description and the drawings, substantially the same elements may be referred to by like reference numerals to avoid overlapping descriptions.

1. Overview: Image Processing Device Based on Retinex Theory

In general, when an image of a scene is acquired by an imaging device such as a digital camera, a brightness range of natural light in the scene may exceed a dynamic range of an imaging element in the imaging device. Therefore, some imaging devices employ a dynamic range compression technology such as high dynamic range (HDR) or backlight compensation to be able to acquire images of subjects for which the brightness range is wider than the dynamic range of the imaging elements. Imaging devices using dynamic range compression technology can compress a brightness range of one or both of a highlight area and a shadow area of an image, thereby enabling acquisition of images of subjects for which the brightness range is wider than the dynamic range of the imaging elements.

Known methods for improving visibility of images having a compressed dynamic range include local dynamic range compensation, which is based on retinex theory.

In detail, according to retinex theory, light acquired as an image is regarded as a product of an illumination light component and a reflectivity component. Letting the illumination light component be denoted by L and the reflectivity component be denoted by R, a brightness component I of an input image can be expressed as Equation (1).

$$I = L \times R \quad (1)$$

Hereinafter, for convenience, I, L and R are respectively referred to as II, LL and RR.

When a local dynamic range compensation is based on retinex theory, an image processing device separately processes the illumination light component LL and the reflectivity component RR of the input image. Thereafter, the brightness component II of the input image may be simply referred to as an input II.

An exemplary configuration of an image processing device for performing local dynamic range compensation based on retinex theory according to an embodiment of the inventive concept will be described with reference to FIG. 1. FIG. 1 is a block diagram of an exemplary configuration of an image processing device 1 according to an embodiment.

As illustrated in FIG. 1, the image processing device 1 according to an embodiment includes an illumination light generation unit 10, a division unit 30, an illumination light modulation unit 50, and a multiplication unit 70.

The illumination light generation unit 10 can generate the illumination light component LL based on the input II. In detail, the illumination light generation unit 10 performs a smoothing operation on the input II, e.g., by applying a smoothing filter, to generate the illumination light component LL from the input II. Furthermore, the illumination light generation unit 10 outputs, to the division unit 30 and the illumination light modulation unit 50, the generated illumination light component LL. The illumination light generation unit 10 will be described in more detail later.

The division unit 30 can generate the reflectivity component RR based on the input II. In detail, the division unit 30 receives the illumination light component LL from the illumination light generation unit 10, and calculates the reflectivity component RR by dividing the input II by the illumination light component LL based on Equation (1). The division unit 30 outputs the calculated reflectivity component RR to the multiplication unit 70.

The illumination light modulation unit 50 receives, from the illumination light generation unit 10, the illumination light component LL generated from the input II. The illumination light modulation unit 50 locally modulates the illumination light component LL to generate a new illumination light component LL', i.e., an illumination light component LL' obtained through local modulation of the illumination light component LL. Furthermore, the illumination light modulation unit 50 outputs the new illumination light component LL' to the multiplication unit 70.

The multiplication unit 70 multiplies the reflectivity component RR received from the division unit 30 by the illumination light component LL' obtained by locally modulating the illumination light component LL and received from the illumination light modulation unit 50, to recombine the components. The multiplication unit 70 outputs, to a predetermined output location, an output image based on a brightness component II' generated by recombining the reflectivity component RR and the illumination light component LL'.

As described above, the image processing device 1 generates and outputs an output image obtained by compensating the dynamic range of an input image.

2. Illumination Light Generation Unit 2.1. Overview

The illumination light generation unit 10 according to an embodiment will be described in detail.

As described above, the illumination light generation unit 10 performs a smoothing operation on the input II, e.g., by applying a smoothing filter, to generate the illumination light component LL from the input II. Due to the smoothing operation performed on the input II, a halo phenomenon may occur. A halo phenomenon occurs when a rapid brightness change at a boundary between a subject and a background is smoothed and contrast of a portion adjacent to the boundary is reduced.

Figure 2:
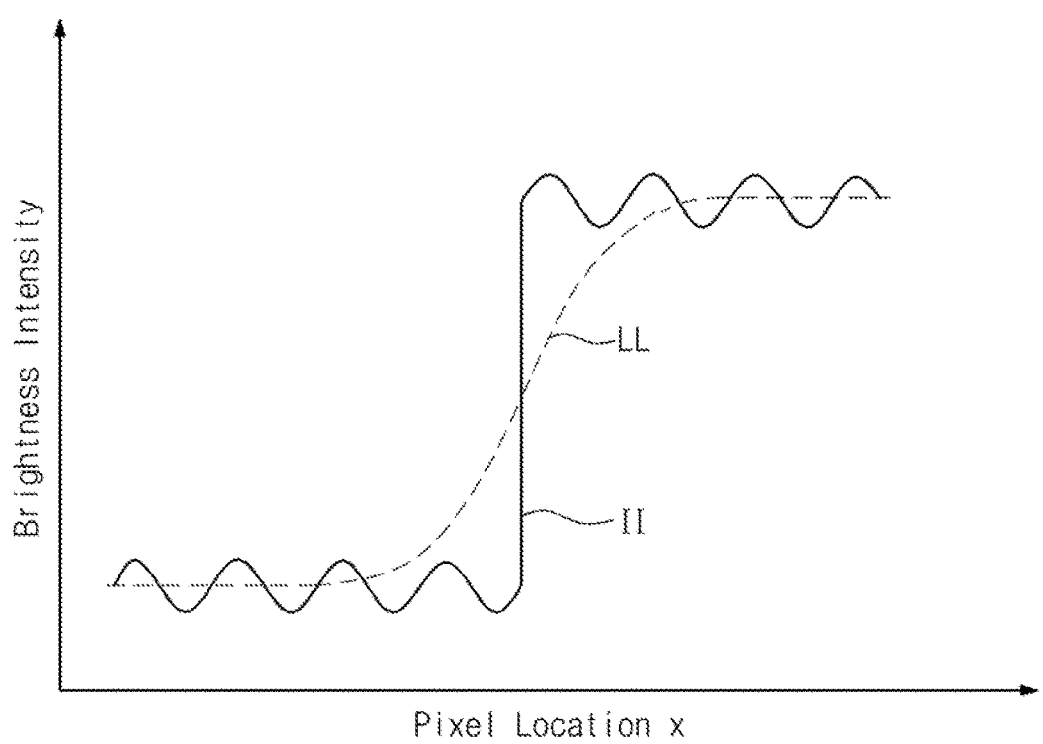
FIG. 2 illustrates an exemplary result of a smoothing operation performed by an illumination light generation unit.

For example, FIG. 2 illustrates an exemplary result of a smoothing operation performed by the illumination light generation unit 10. In detail, FIG. 2 illustrates a change in brightness intensity for each pixel of an image with respect to an input and an output when a smoothing operation is performed on a boundary between a subject and a background. Herein, the brightness intensity represents, for example, a pixel value, a luminance value, or a lightness value. In the description below, brightness intensity may correspond to any one of the forgoing values. In the graph of FIG. 2, the horizontal axis represents a pixel location in an image and a vertical axis represents the brightness intensity. Furthermore, in the graph of FIG. 2, reference sign II represents a brightness component of an input image, and reference sign LL represents an output, such as a generated illumination light component, after the smoothing operation is performed on the input II.

As illustrated in FIG. 2, once the smoothing operation is performed on the boundary between the subject and the background in the input II, an illumination light component LL is generated that has a reduced brightness change at the boundary. As the rapid brightness change between the subject and the background is reduced, contrast at the boundary between the subject and the background is reduced, which may induce the halo phenomenon.

Figure 3:
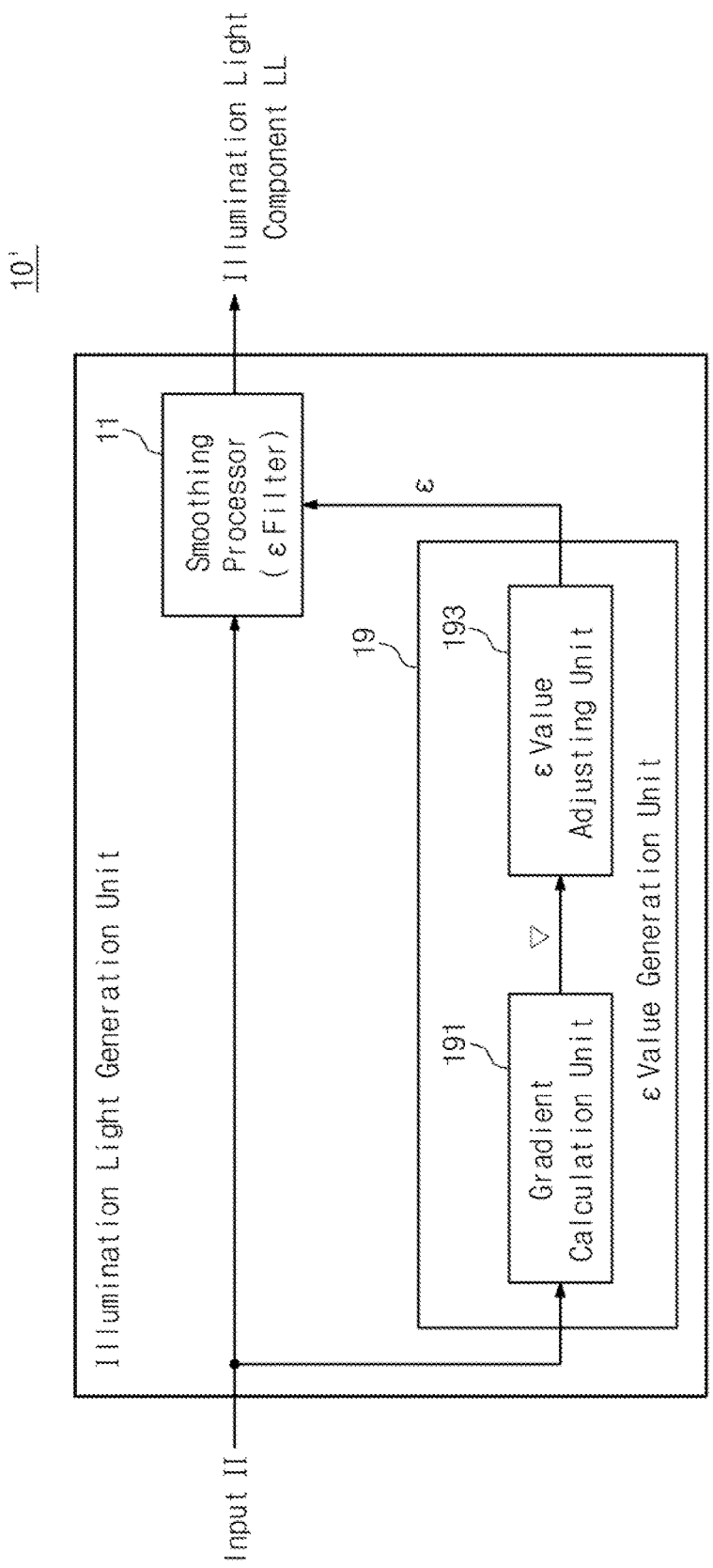
FIG. 3 is a block diagram of an exemplary function configuration of an illumination light generation unit according to a comparative example.

A comparative example of the illumination light generation unit 10 generating the illumination light component LL while avoiding the occurrence of the halo phenomenon will be described with reference to FIG. 3. FIG. 3 is a block diagram of an exemplary configuration of the illumination light generation unit 10' according to a comparative example.

In the illumination light generation unit 10' according to a comparative example illustrated in FIG. 3, an ϵ filter is adopted for a smoothing operation, and an ϵ value of the ϵ filter is controlled to perform the smoothing operation while maintaining an edge with respect to the input II.

In detail, as illustrated in FIG. 3, the illumination light generation unit 10' according to a comparative example includes a smoothing processor 11 and an ϵ value generation unit 19. The smoothing processor 11 corresponds to the ϵ filter. The ϵ value generation unit 19 includes a gradient calculation unit 191 and an ϵ value adjusting unit 193.

The gradient calculation unit 191 calculates a gradient ∇ for each pixel of interest based on the brightness intensity of those pixels adjacent to the pixel of interest, in which each pixel of an input image II is sequentially processed as the pixel of interest.

An exemplary, non-limiting method for calculating the gradient ∇ by the gradient calculation unit 191 may use a primary differential filter, such as a high-pass filter, as expressed by Equation (2) below.

$$|\nabla|(x,y)=|I(x-n,y)-I(x+n,y)|+|I(x,y-n)-I(x,y+n)| \qquad (2)$$

In Equation (2), n denotes an operator length for specifying an adjacent pixel. Furthermore, I(x−n, y) and I(x+n, y) denote a brightness component of an adjacent pixel displace by n pixels in an x direction, such as a horizontal direction, with respect to a pixel of interest. Likewise, I(x, y−n) and I(x, y+n) denote a brightness component of an adjacent pixel displace by n pixels in a y direction, such as a vertical direction, with respect to a pixel of interest. In addition, a tap number is 3 when the operator length is n=1, and the tap number is 5 when the operator length is n=2.

As another example, the gradient calculation unit 191 may calculate the gradient using a band limiting filter having a smoothing effect as expressed by Equation (3) below.

$$|\nabla|(x,y) = \left| \sum_{j=-n}^{+n} [I(x-n, y+j) - I(x+n, y+j)] \right| + \left| \sum_{j=-n}^{+n} [I(x+i, y-n) - I(x+i, y+n)] \right|. \qquad (3)$$

As described above, for each pixel of interest, the gradient calculation unit 191 calculates the gradient ∇ based on the brightness intensity of pixels adjacent to the pixel of interest. Furthermore, the gradient calculation unit 191 outputs, to the ε value adjusting unit 193, the gradient ∇ calculated for each pixel of interest.

The ε value adjusting unit 193 receives, from the gradient calculation unit 191, the gradient ∇ calculated for each pixel of interest in an input image. The ε value adjusting unit 193 interprets the gradient ∇, more specifically, an absolute value of the gradient ∇, calculated for each pixel of interest as an edge strength KG for the pixel of interest. That is, letting the coordinates of the pixel of interest be (x,y) and the gradient of the pixel of interest be ∇(x,y), the edge strength KG(x,y) of the pixel of interest can be derived from Equation (4) below.

$$K_G(x,y)=|\nabla(x,y)| \qquad (4)$$

Figure 4:
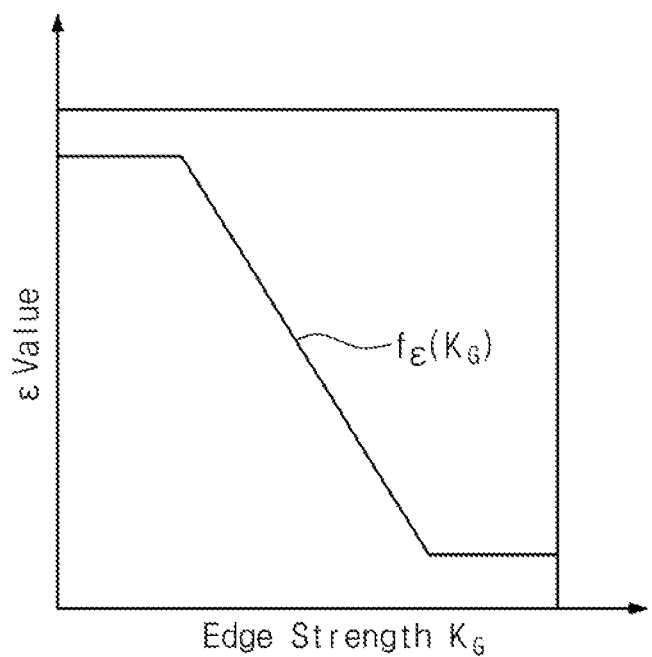
FIG. 4 illustrates an exemplary function for performing an edge strength–ϵ value conversion by an ϵ value adjusting unit.

Furthermore, the ε value adjusting unit 193 converts the edge strength KG into an ε value so that the ε value decreases as the edge strength KG increases, but increases as the edge strength KG decreases, i.e., performs edge strength–ε value conversion. FIG. 4 illustrates an example of a function fε(KG) of the ε value adjusting unit 193 that performs the edge strength–ε value conversion.

As described above, the ε value adjusting unit 193 calculates, for each pixel of interest, the ε value of the pixel of interest, and outputs the calculated ε value to the smoothing processor 11.

The smoothing processor 11 receives, from the ε value adjusting unit 193, the ε value calculated for each pixel of interest in an input image, and applies an ε filter to the pixel of interest and pixels adjacent thereto based on the acquired ε value. As described above, the smoothing processor 11 performs a smoothing operation by applying the ε filter to the input II, and outputs a brightness component that results from the smoothing operation as the illumination light component LL.

By virtue of the above-described configuration, the illumination light generation unit 10' according to a comparative example performs a nonlinear smoothing operation on the input II to reduce the effect of smoothing for a portion determined as an edge to maintain the edge, but the effects of smoothing increase for portions other than the edge. In this way, the illumination light generation unit 10' according to a comparative example can generate the illumination light component LL while avoiding the occurrence of a halo phenomenon.

According to the illumination light generation unit 10' according to a comparative example, a boundary between a background and a subject, referred to herein as a "stairs tone edge", is not substantially differentiated from a boundary in which contrast (gradation) changes due to a shape of a subject, referred to herein as a "pattern tone edge". Therefore, the illumination light generation unit 10' calculates the edge strength KG without differentiating a stairs tone edge from a pattern tone edge, and performs a smoothing operation according to the edge strength KG.

Figure 5:
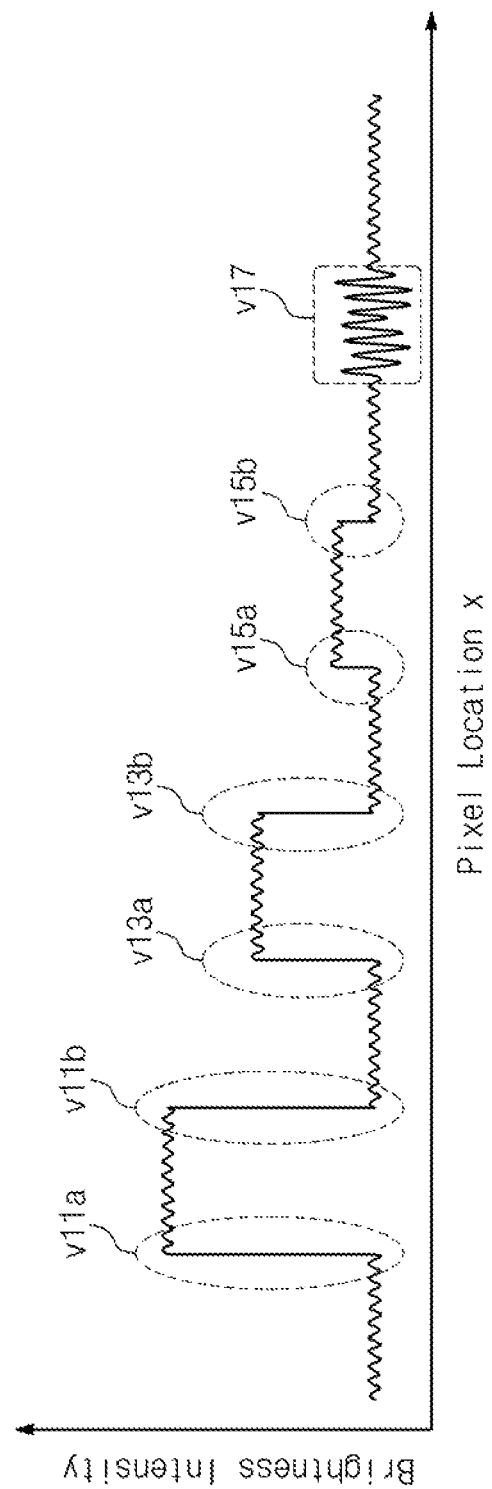
FIG. 5 illustrates an example of an input II.

For example, FIG. 5 illustrates an example of the input II, more specifically, an example of a change in brightness intensity of each pixel in an input image. For ease of description, FIG. 5 illustrates the change in brightness intensity of each pixel in the input image with respect to an x direction, such as a horizontal direction, of the input image. That is, the horizontal axis of the graph of FIG. 5 represents a pixel location in the input image with respect to the x direction. Furthermore, the vertical axis of the graph of FIG. 5 represents a brightness intensity of each pixel.

Figure 6:
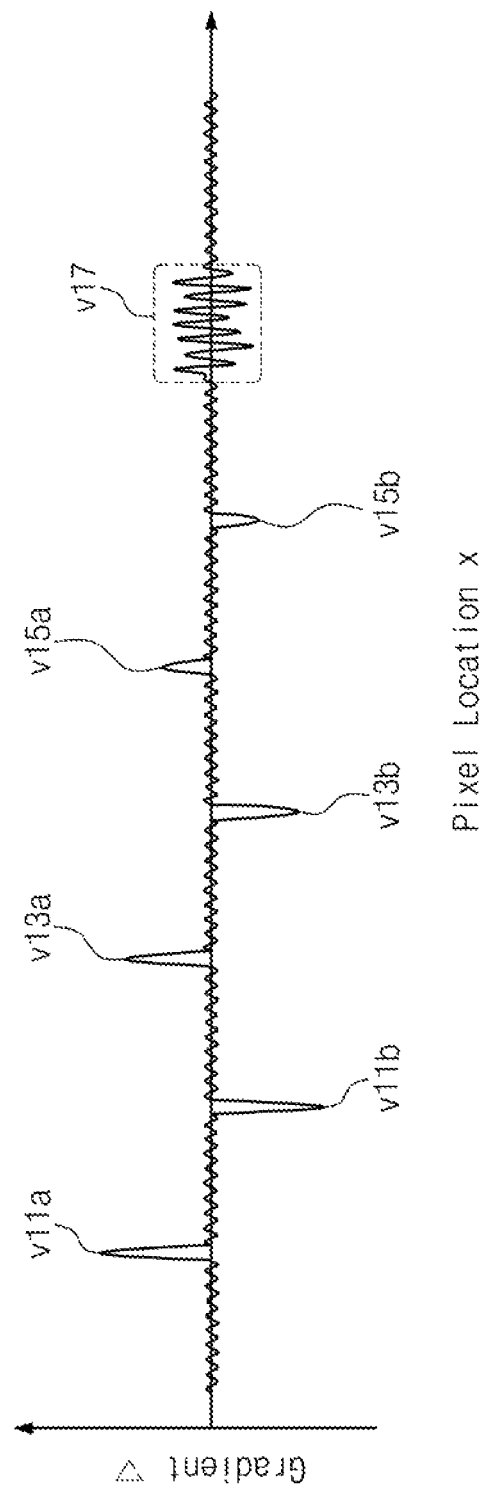
FIG. 6 illustrates an example of a change in a gradient $\nabla$ for each pixel of an input image in the case where the gradient $\nabla$ is calculated by applying a primary differential filter to the input II illustrated in FIG. 5.

FIG. 6 illustrates an example of a change in the gradient ∇ for each pixel in the input image when the gradient ∇ is calculated by applying a primary differential filter to the input II illustrated in FIG. 5. That is, the horizontal axis of the graph of FIG. 6 corresponds to the horizontal axis of the graph of FIG. 5 and represents a pixel location in the input image with respect to the x direction. Furthermore, the vertical axis of the graph of FIG. 6 represents the gradient ∇ calculated for each pixel.

In FIG. 5, portions v11a, v11b, v13a, v13b, v15a, and v15b schematically represent portions of the input image in which contrast changes by a stairs tone edge. The portion v17 schematically represents a portion in which contrast changes by a pattern tone edge. Furthermore, in FIG. 6, the portions v11a, v11b, v13a, v13b, v15a, v15b, and v17 correspond to the same locations as those of the portions v11a, v11b, v13a, v13b, v15a, v15b, and v17 in FIG. 5.

In FIG. 6, stairs tone edges v15a and v15b and a pattern tone edge v17b have the same gradient value ∇. Therefore, when the gradient ∇ is interpreted as the edge KG, the illumination light generation unit 10' may not differentiate the stairs tone edges v15a and v15b from the pattern tone edge v17b.

Here, a portion in which contrast changes due to an object's shape, such as a pattern tone portion, may be regarded as being uniformly illuminated regardless of the shape, and, in some cases, the pattern tone portion may undergo a smoothing operation without maintaining an edge. However, the illumination light generation unit 10' according to a comparative example maintains not only a stairs tone edge but also a pattern tone portion. Therefore, when an input image is processed by the illumination light generation unit 10' according to a comparative example, a blurred image may be output as a result of compressing contrast of a subject of the input image due to the smoothing operation.

The illumination light generation unit 10 according to an embodiment can differentiate a stairs tone edge from a pattern tone edge in an input image, thereby enabling nonlinear smoothing processing for the input image. The illumination light generation unit 10 according to an embodiment is described in more detail below.

2.2. Function Configuration

Figure 7:
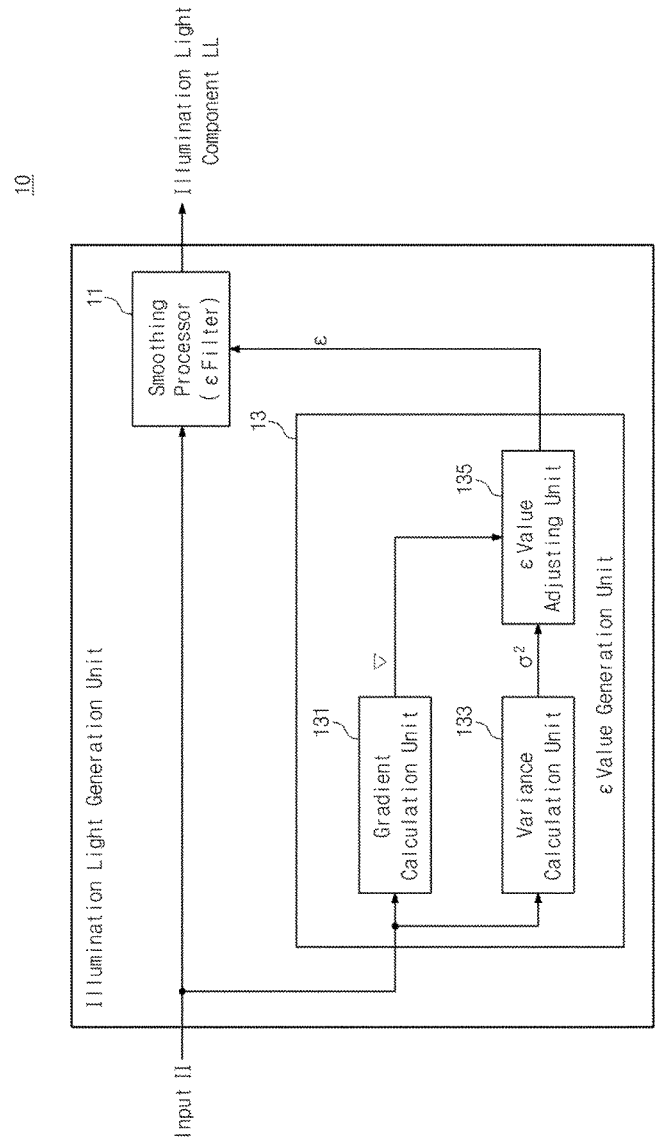
FIG. 7 is a block diagram of an exemplary configuration of an illumination light generation unit according to an embodiment.

An exemplary configuration of the illumination light generation unit 10 according to an embodiment will be described with reference to FIG. 7. FIG. 7 is a block diagram of an exemplary configuration of the illumination light generation unit 10 according to an embodiment.

As illustrated in FIG. 7, the illumination light generation unit 10 according to an embodiment includes a smoothing processor 11 and an ϵ value generation unit 13. Since the smoothing processor 11 is substantially the same as that of the illumination light generation unit 10' described above with respect to FIG. 3, a repeated detailed description is omitted below. The ϵ value generation unit 13 includes a gradient calculation unit 131, a variance calculation unit 133, an ϵ value adjusting unit 135.

The gradient calculation unit 131 is substantially the same as the gradient calculation unit 191 of the illumination light generation unit 10' according to a comparative example described above. That is, the gradient calculation unit 131 calculates a gradient ∇ for each pixel of interest based on a brightness intensity of pixels adjacent to the pixel of interest, wherein each pixel of an input image Il is sequentially processed as the pixel of interest.

Furthermore, the gradient calculation unit 131 may calculate the gradient ∇ for each pixel of interest by calculating a convolution integral using a filter operator. Equation (5) below is an example of expressing the primary differential filter of Equations (2) or (3) as a convolution integral.

$$f'(x) = \nabla f(x) = W \otimes X \quad (5)$$

In Equation (5), W denotes an operator for calculating the gradient ∇, also referred to as a "gradient operator" below, and X represents a pixel location. Equation (6) below is an example of the gradient operator W when an operator length is n=1.

$$W = [-1 \ 0 \ 1] \cdot \frac{1}{2} \quad (6)$$

For another example, Equation (7) below is an example of the gradient operator W when an operator length is n=2.

$$W = [-1 \ -1 \ 0 \ 1 \ 1] \cdot \frac{1}{4} \quad (7)$$

The gradient operators of Equations (6) and (7) are non-limiting examples, and either the operator length n or the coefficient of the operators may change appropriately.

As described above, for each pixel of interest, the gradient calculation unit 131 calculates the gradient ∇ based on a brightness intensity of the pixels adjacent to the pixel of interest. Furthermore, the gradient calculation unit 131 outputs, to the ϵ value adjusting unit 135, the gradient ∇ calculated for each pixel of interest.

The variance calculation unit 133 calculates a variance $\sigma^2$ for each pixel of interest based on the brightness intensities of the pixel of interest and pixels adjacent to the pixel of interest, wherein each pixel in an input image Il is sequentially processed as the pixel of interest.

Here, the variance $\sigma^2(x, y)$ of the pixel of interest may be calculated based on Equation (8) below, where the coordinates of the pixel of interest are (x, y) and the brightness intensity of a pixel at coordinates (x-i, y-j) is $I_{x-j, y-i}$.

$$\sigma^2(x, y) = \frac{1}{(2m+1)^2} \sum_{i=-m}^{m} \sum_{j=-m}^{m} (I_{x-i,y-j} - \bar{I})^2 \quad (8)$$

$$\bar{I} = \frac{1}{(2m+1)^2} \sum_{i=-m}^{m} \sum_{j=-m}^{m} I_{x-i,y-j}$$

Equation (8) may be expanded as expressed by Equation (9) below.

$$\begin{aligned}
\sigma^2(x, y) &= \frac{1}{(2m+1)^2} \sum_{i=-m}^{m} \sum_{j=-m}^{m} (I_{x-i,y-j} - \bar{I})^2 \\
&= \frac{1}{(2m+1)^2} \sum_{i=-m}^{m} \sum_{j=-m}^{m} (I_{x-i,y-j}^2 - 2I_{x-i,y-j} \cdot \bar{I} + \bar{I}^2) \\
&= \frac{1}{(2m+1)^2} \sum_{i=-m}^{m} \sum_{j=-m}^{m} I_{x-i,y-j}^2 - \frac{1}{(2m+1)^2} \\
&\quad \sum_{i=-m}^{m} \sum_{j=-m}^{m} 2I_{x-i,y-j} \cdot \bar{I} + \frac{1}{(2m+1)^2} \sum_{i=-m}^{m} \sum_{j=-m}^{m} \bar{I}^2 \\
&= \frac{1}{(2m+1)^2} \sum_{i=-m}^{m} \sum_{j=-m}^{m} I_{x-i,y-j}^2 - \frac{2\bar{I}}{(2m+1)^2} \\
&\quad \sum_{i=-m}^{m} \sum_{j=-m}^{m} I_{x-i,y-j}^2 + \bar{I}^2 \\
&= \frac{1}{(2m+1)^2} \sum_{i=-m}^{m} \sum_{j=-m}^{m} I_{x-i,y-j}^2 - 2\bar{I}\bar{I} + \bar{I}^2 \\
&= \frac{1}{(2m+1)^2} \sum_{i=-m}^{m} \sum_{j=-m}^{m} I_{x-i,y-j}^2 - \bar{I}^2
\end{aligned} \quad (9)$$

Figure 8:
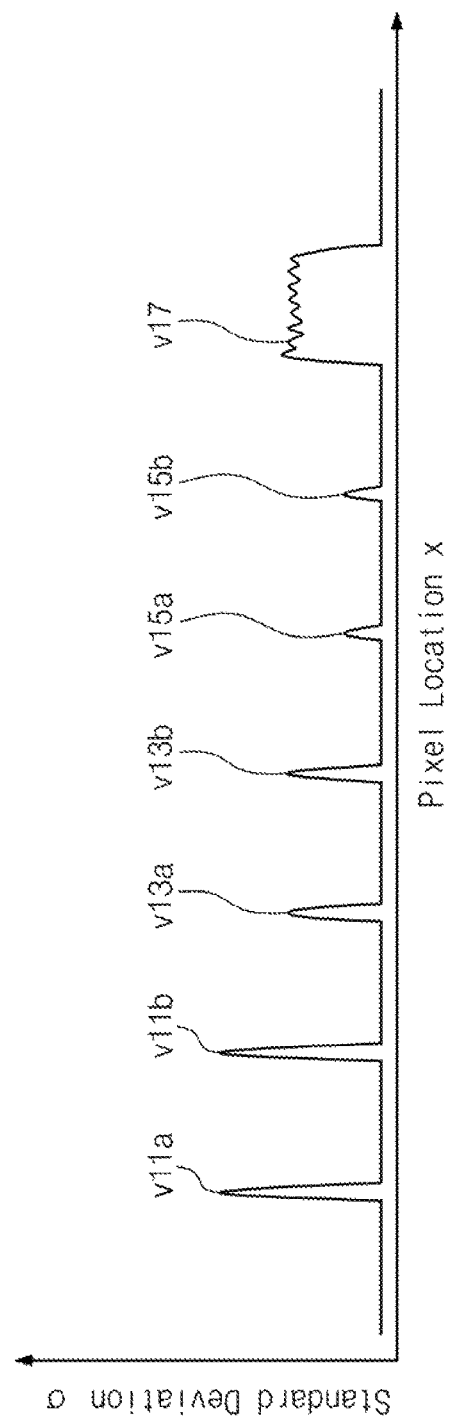
FIG. 8 illustrates an example of a change in a standard deviation $\sigma$ based on a variation $\sigma^2$ calculated for each pixel of an input image II illustrated in FIG. 5.

FIG. 8 illustrates an example of a change in a standard deviation σ based on the variance $\sigma^2$ calculated for each pixel of the input image Il illustrated in FIG. 5. Furthermore, to match units with respect to the gradient ∇ for each pixel illustrated in FIG. 6, the horizontal axis of the graph of FIG. 8 corresponds to the horizontal axis of the graph of FIG. 6 and represents a pixel location in the input image with respect to the x direction. Furthermore, the vertical axis of the graph of FIG. 8 represents the standard deviation σ calculated for each pixel. It may be understood that the standard deviation σ is calculated from the square root of the variance $\sigma^2$. In other words, the variance calculation unit 133 may calculate the standard deviation σ from the variance $\sigma^2$.

As described above, for each pixel of interest, the variance calculation unit 133 calculates the variance $\sigma^2$ based on the brightness intensities of the pixel of interest and pixels adjacent to the pixel of interest. Furthermore, the variance calculation unit 133 outputs, to the ϵ value adjusting unit 135, the variance $\sigma^2$ calculated for each pixel of interest.

The ϵ value adjusting unit 135 receives, from the gradient calculation unit 131, the gradient ∇ calculated for each pixel of interest. Furthermore, the $\epsilon$ value adjusting unit 135 receives, from the variance calculation unit 133, the variance $\sigma^2$ calculated for each pixel of interest.

The $\epsilon$ value adjusting unit 135 according to an embodiment will be described by comparing the change in the gradient $\nabla$ for each pixel illustrated in FIG. 6 and the change in the standard deviation $\sigma$ or variance $\sigma^2$ for each pixel illustrated in FIG. 8.

As described above with reference to FIG. 6, when considering the gradient $\nabla$ for each pixel, the stairs tone edges s v15*a* and v15*b* and the pattern tone edge v17*b* have approximately the same gradient $\nabla$ magnitude, and may not be differentiated from each other.

On the other hand, when considering the standard deviation $\sigma$ for each pixel, as illustrated in FIG. 8, the stairs tone edges v15*a* and v15*b* and the pattern tone edge v17*b* have different standard deviation $\sigma$ values, and thus can be differentiated from each other. In addition, the stairs tone edges v13*a* and v13*b* and the pattern tone edge v17 have approximately the same standard deviation $\sigma$ value, and may not be differentiated from each other.

By comparing FIGS. 6 and 8, it may be seen that the gradient $\nabla$ differs from the standard deviation $\sigma$ in a portion where a stairs tone edge is not differentiated from a pattern tone edge. This difference is due to different characteristics of the gradient $\nabla$ and the standard deviation $\sigma$. The $\epsilon$ value adjusting unit 135 according to an embodiment can differentiates a stairs tone edge from a pattern tone edge using these different characteristics.

In detail, the gradient $\nabla$ represents a difference between pixels adjacent to or near a pixel of interest. In Equation (8), the standard deviation $\sigma$ represents a change over a range defined based on an operator length m. In an ideal state, with regard to a stairs tone edge, a maximum value or peak of the standard deviation $\sigma$ tends to have approximately the same value as a maximum value of of the gradient $\nabla$ magnitude. However, with regard to a pattern tone edge, the standard deviation $\sigma$ tends to have a larger value than that of the gradient $\nabla$ magnitude. Here, the $\epsilon$ value adjusting unit 135 according to an embodiment calculates a ratio of the gradient $\nabla$ and the standard deviation $\sigma$ as a stairs tone strength KS, and differentiates a stairs tone edge and a pattern tone edge based on the stairs tone strength KS.

For example, letting the coordinates of a pixel of interest be (x, y), the stairs tone strength KS(x, y) for the pixel of interest can be calculated from the gradient $\nabla$(x, y) and the standard deviation $\sigma$(x, y) of the pixel of interest as expressed by Equation (10) below.

$$K_S(x, y) = \frac{k_\nabla \cdot |\nabla(x, y)|}{k_\sigma \cdot \sigma(x, y)} = k \cdot \frac{|\nabla(x, y)|}{\sigma(x, y)} \tag{10}$$

In Equation (10), $k_\nabla$ and $k_\sigma$ are compensation coefficients or normalization coefficients for the gradient $\nabla$(x, y) and the standard deviation $\sigma$(x, y), respectively, and are determined so that a ratio between the absolute value of the $\nabla$(x, y) and the absolute value of the standard deviation $\sigma$(x, y) is 1. Furthermore, the compensation coefficient k represents a simplification of the coefficients $k_\nabla$ and $k_\sigma$.

The coefficients $k_\nabla$ and $k_\sigma$ may be pre-calculated integers. For another non-limiting example, based on a plurality of ideal stairs tone edges with different brightness intensities, a function for compensating $|\nabla|/(\sigma)$ may be pre-calculated using the compensation coefficients $k_\nabla$ and $k_\sigma$.

By generalizing Equation (10), the stairs tone strength KS may be expressed as Equation (11) below.

$$K_S = \frac{k_\nabla \cdot |\nabla|}{k_\sigma \cdot \sigma} = k \cdot \frac{|\nabla|}{\sigma} \tag{11}$$

Here, the stairs tone strength KS has a value of 1 or less, and, as the stairs tone strength KS approaches 1, brightness changes more rapidly in the neighborhood of a corresponding pixel of interest. That is, as the stairs tone strength KS more closely approximates 1, the corresponding pixel of interest may more probably correspond to a stairs tone edge.

The above-mentioned equation for calculating the stairs tone strength KS is a non-limiting example. A method of calculating the stairs tone strength KS is not limited to the example if the method indicates the ratio of the gradient $\nabla$ and the standard deviation $\sigma$ or variance $\sigma^2$.

As a specific example, the $\epsilon$ value adjusting unit 135 may calculate the stairs tone strength KS based on the ratio of the square of the gradient $\nabla$ and the variance $\sigma^2$. In this case, letting the coordinates of a pixel of interest be (x, y), the stairs tone strength KS(x, y) of the pixel of interest may be calculated from the gradient $\nabla$(x, y) and the variance $\sigma^2$(x, y) of the pixel of interest as expressed by Equation (12) below.

$$K_S(x, y) = \frac{k_\nabla \cdot \nabla^2(x, y)}{k_\sigma \cdot \sigma^2(x, y)} = k \cdot \frac{\nabla^2(x, y)}{\sigma^2(x, y)} \tag{12}$$

By generalizing Equation (12), the stairs tone strength KS may be expressed as Equation (13) below.

$$K_S = \frac{k_\nabla \cdot \nabla^2}{k_\sigma \cdot \sigma^2} = k \cdot \frac{\nabla^2}{\sigma^2} \tag{13}$$

As another example, the $\epsilon$ value adjusting unit 135 may calculate the stairs tone strength KS based on a difference between the square of the gradient $\nabla$ and the variance $\sigma^2$ as the degree of gap. In this case, letting the coordinates of a pixel of interest be (x, y), the stairs tone strength KS(x, y) for the pixel of interest can be calculated from the gradient $\nabla$(x, y) and the variance $\sigma^2$(x, y) of the pixel of interest as expressed by Equation (14) below.

$$K_S(x, y) = k_\sigma \cdot \sigma^2(x, y) - k_\nabla \cdot \nabla^2(x, y) \tag{14}$$

By generalizing Equation (14), the stairs tone strength KS may be expressed as Equation (15) below.

$$K_S = k_\sigma \cdot \sigma^2 - k_\nabla \cdot \nabla^2 \tag{15}$$

Figure 9:
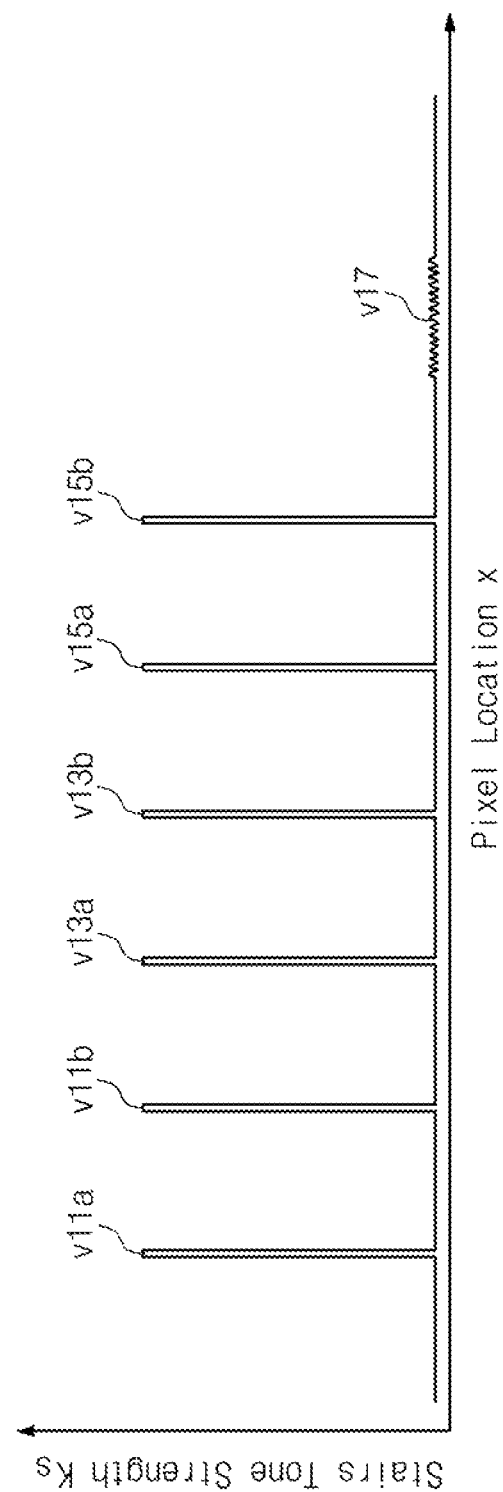
FIG. 9 illustrates an example of a change in a stairs tone strength KS calculated for each pixel of an input image II illustrated in FIG. 5.

As described above, the $\epsilon$ value adjusting unit 135 can calculate the stairs tone strength KS based on differences between the gradient $\nabla$ and the standard deviation $\sigma$ or variance $\sigma^2$. For example, FIG. 9 illustrates an example of a change in the stairs tone strength KS calculated for each pixel of an input image II illustrated in FIG. 5, i.e., calculated based on the gradient $\nabla$ for each pixel illustrated in FIG. 6 and the standard deviation $\sigma$ for each pixel illustrated in FIG. 8. That is, the horizontal axis of the graph of FIG. 9 corresponds to the horizontal axes of the graphs of FIGS. 5, 6 and 8 and represents a pixel location in the input image with respect to the x direction. Furthermore, the vertical axis of the graph of FIG. 9 represents the stairs tone strength KS calculated for each pixel.

As shown in FIG. 9, stairs tone edges v11a, v11b, v13a, v13b, v15a, and v15b are differentiated from pattern zone edge v17 by the stairs tone strength KS.

As a non-limiting specific example, when the stairs tone strength KS is calculated, an operator length n, such as the variable n in Equation (2), for calculating the gradient ∇ is set equal to an operator length m, such as the variable m in Equation (8), for calculating the variance $\sigma^2$. In this case, with regard to a stairs tone edge, even if the compensation coefficients $k_\nabla$ and $k_\sigma$ are set to be 1, there is little difference between the gradient ∇ magnitude and the standard deviation σ, and the stairs tone strength KS is approximately 1. On the other hand, regarding a pattern tone edge, the gradient ∇ magnitude is less than the standard deviation σ, and the stairs tone strength KS has a smaller value than that for a stairs tone edge.

Based on such characteristics, the ε value adjusting unit 135 can calculate, for each pixel of interest in an input image, an edge strength KG for a pattern tone edge by multiplying the gradient ∇ magnitude of the pixel of interest by the stairs tone strength KS of the pixel of interest. That is, letting the coordinates of a pixel of interest be (x, y), the edge strength KG(x, y) of the pixel of interest can be calculated from the gradient ∇(x, y) and the stairs tone strength KS of the pixel of interest as expressed by Equation (16) below.

$$K_G(x, y) = |\nabla(x, y)| \cdot K_S \quad (16)$$

The operator length n for calculating the gradient ∇ and the operator length m for calculating the variance $\sigma^2$ may be set so that n≤m.

As another non-limiting example, the ε value adjusting unit 135 may calculate, for each pixel of interest in an input image, the edge strength KG by multiplying a second differential $\nabla^2$ of the pixel by the stairs tone strength KS as expressed by Equation (17) below.

$$K_G(x, y) = \nabla^2(x, y) \cdot K_S \quad (17)$$

Figure 10:
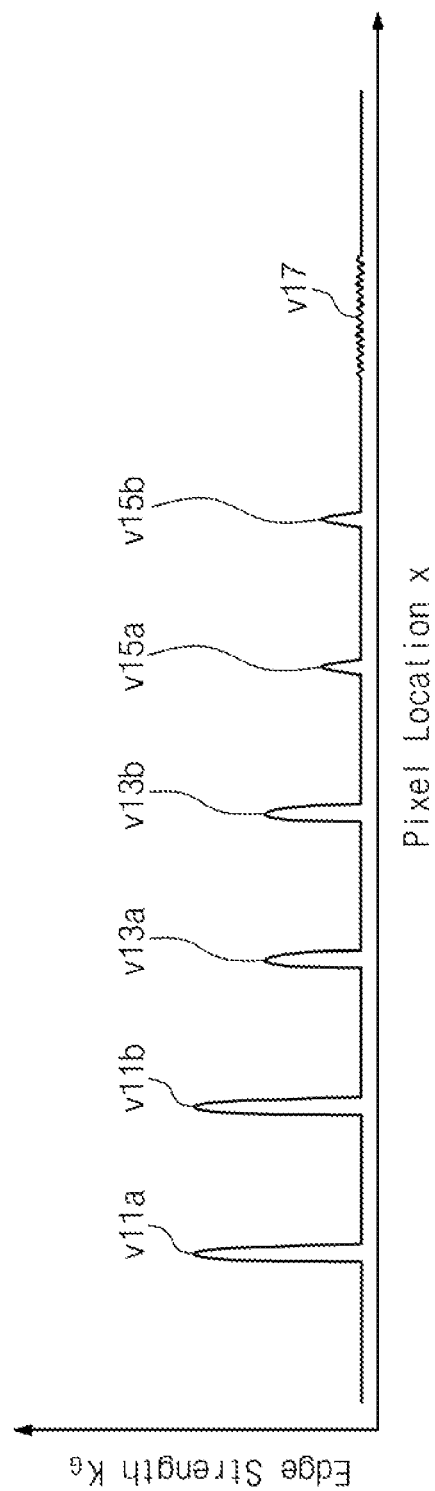
FIG. 10 illustrates an example of a change in an edge strength KG calculated for each pixel of an input image II illustrated in FIG. 5.

As described above, the ε value adjusting unit 135 can calculate, for each pixel of interest in an input image, the edge strength KG from the gradient ∇ of the pixel of interest and the stairs tone strength KS of the pixel of interest. FIG. 10 illustrates a non-limiting example of a change in the edge strength KG calculated for each pixel of an input image II illustrated in FIG. 5, i.e., calculated from the gradient ∇ for each pixel as illustrated in FIG. 6 and the stairs tone strength KS for each pixel as illustrated in FIG. 9. That is, the horizontal axis of the graph of FIG. 10 corresponds to the horizontal axes of the graphs of FIGS. 5, 6 and 9 and represents a pixel location in the input image with respect to the x direction. Furthermore, the vertical axis of the graph of FIG. 10 represents the edge strength KG calculated for each pixel.

As shown in FIG. 10, since the edge strength KG is calculated from the stairs tone strength KS and the gradient ∇ for each pixel of interest, a pattern tone edge v17 is suppressed, and stairs pattern edges v11a, v11b, v13a, v13b, v15a, and v15b are identified by the edge strength KG. That is, the ε value adjusting unit 135 can perform edge strength–ε value conversion to adjust the ε value based on the edge strength KG calculated as described above, so that, among a stairs tone edge and a pattern tone edge, the stairs tone edge can be maintained.

Figure 11:
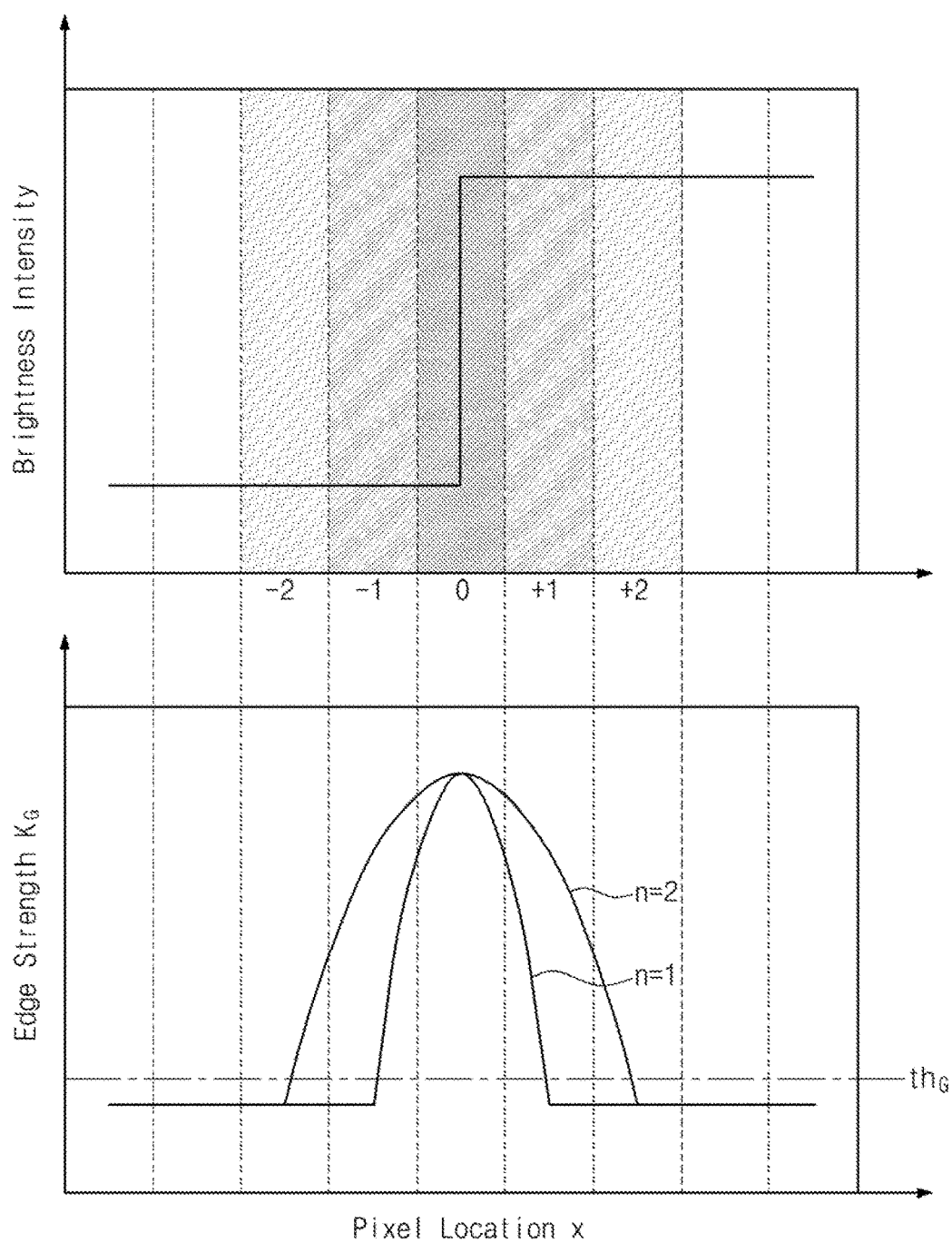
FIG. 11 illustrates a process of adjusting an ϵ value by an ϵ value adjusting unit according to an embodiment.

The adjustment of the ε value performed by the ε value adjusting unit 135 based on the edge strength KG will be described in detail with reference to FIG. 11. FIG. 11 illustrates a process of adjusting the ε value by the ε value adjusting unit 135 according to an embodiment.

The upper graph of FIG. 11 illustrates a change in brightness strength for each pixel in an input image. The lower graph of FIG. 11 illustrates a change in the edge strength KG for each pixel of interest in the input image. Each of the horizontal axes of the upper and lower graphs of FIG. 11 represents a pixel location in the input image with respect to the x direction. Furthermore, the vertical axis of the upper graph of FIG. 11 represents a brightness intensity, and the vertical axis of the lower graph of FIG. 11 represents the edge strength KG.

In FIG. 11, the operator length n for calculating the gradient ∇ and the operator length m for calculating the variance $\sigma^2$ satisfy the relation of m=n. Furthermore, in FIG. 11, a pixel location x=0 corresponds to a stairs tone edge portion, and the locations x=±1, ±2 correspond to adjacent pixels along the x direction where a pixel at location x=0 is a pixel of interest.

In the example illustrated in FIG. 11, if the operator length n of an ε filter, is 2, a halo phenomenon may occur in an area where the pixel location ranges from −2 to +2. Therefore, in the example of FIG. 11, the ε value of the ε filter may be decreased or minimized in the area where the pixel location ranges from −2 to +2.

Here, as illustrated in the lower graph of FIG. 11, the ε value adjusting unit 135 sets a threshold value thG for the edge strength KG and compares the edge strength KG calculated for each pixel of interest with the threshold value thG. For example, the ε value adjusting unit 135 may set the ε value to a minimum value εMIN for a pixel for which the edge strength KG exceeds the threshold value thG, and may set the ε value to a maximum value εMAX for a pixel for which the edge strength KG is less than or equal to the threshold value thG.

Figure 12:
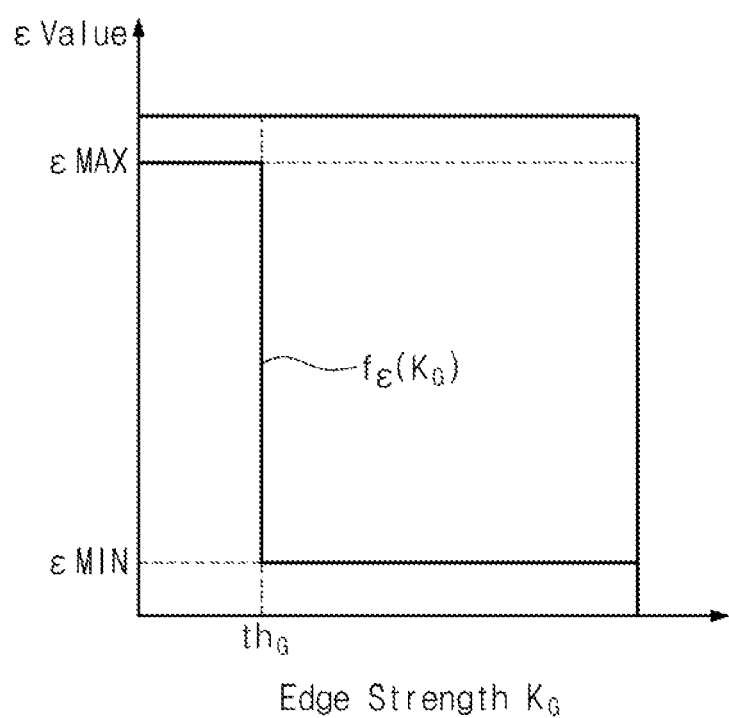
FIG. 12 illustrates an exemplary function for setting the ϵ value by the ϵ value adjusting unit based on the edge strength KG.

FIG. 12 illustrates a non-limiting example of a function fε(KG) for setting, by the ε value adjusting unit 135, the ε value based on the edge strength KG, i.e., for performing edge strength–ε value conversion.

Figure 13:
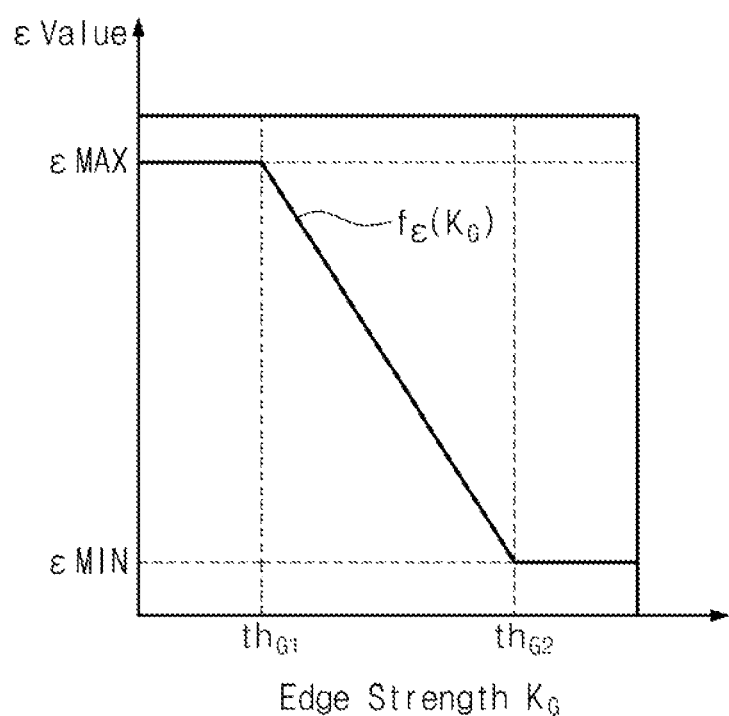
FIG. 13 illustrates another exemplary function for setting the ϵ value by the ϵ value adjusting unit based on the edge strength KG.

For comparison, FIG. 13 illustrates another example of the function fε(KG) for performing the edge strength–ε value conversion by the ε value adjusting unit 135. The comparative example of FIG. 13 illustrates the function fε(KG) for performing the edge strength–ε value conversion using a same method as performed by the ε value adjusting unit 193 of the illumination light generation unit 10' in FIG. 3.

As illustrated in FIG. 13, the ε value adjusting unit 193 according to a comparative example linearly modulates the ε value between the maximum and minimum values εMAX and εMIN in a region where the edge strength is between threshold values thG1 and thG2. Since the ε value adjusting unit 193 may not differentiate a stairs tone edge from a pattern tone edge, the ε value is a function of the edge strength KG that does not differentiate a stairs tone edge from a pattern tone edge.

Due to such characteristics, according to the ε value adjusting unit 193 according to a comparative example, a pattern tone edge with a strong edge strength may be maintained without being smoothed, and a stairs tone edge with a weak edge strength may be smoothed and not maintained. Furthermore, according to the ε value adjusting unit 193 according to a comparative example, a smoothing operation is performed on pixels with a relatively weak edge strengths at positions x=±1, ±2 in FIG. 11. Therefore, the edge strength of the pixel is decreased, and a weak halo phenomenon may occur in the vicinity of the pixel due to the smoothing operation.

Regarding this issue, the $\epsilon$ value adjusting unit 135 according to an embodiment can adjust the $\epsilon$ value based on the edge strength KG calculated from the stairs tone strength KS and the gradient $\nabla$ for each pixel of interest. As described above, the edge strength KG has a high value for a stairs edge portion and a low value for other portions, including a a pattern tone edge portion. Therefore, the $\epsilon$ value adjusting unit 135 can perform edge strength–$\epsilon$ value conversion based on the threshold value thG as illustrated in FIG. 12.

Furthermore, due to the above-mentioned characteristics of the edge strength KG, the $\epsilon$ value adjusting unit 135 according to an embodiment may set the threshold value thG to a relatively low value that is lower than at least the threshold value thG2 shown in FIG. 13. Therefore, according to the $\epsilon$ value adjusting unit 135 according to an embodiment, an edge can be maintained even for relatively low edge strength pixels at positions x=±1, ±2 in FIG. 11.

Figure 14:
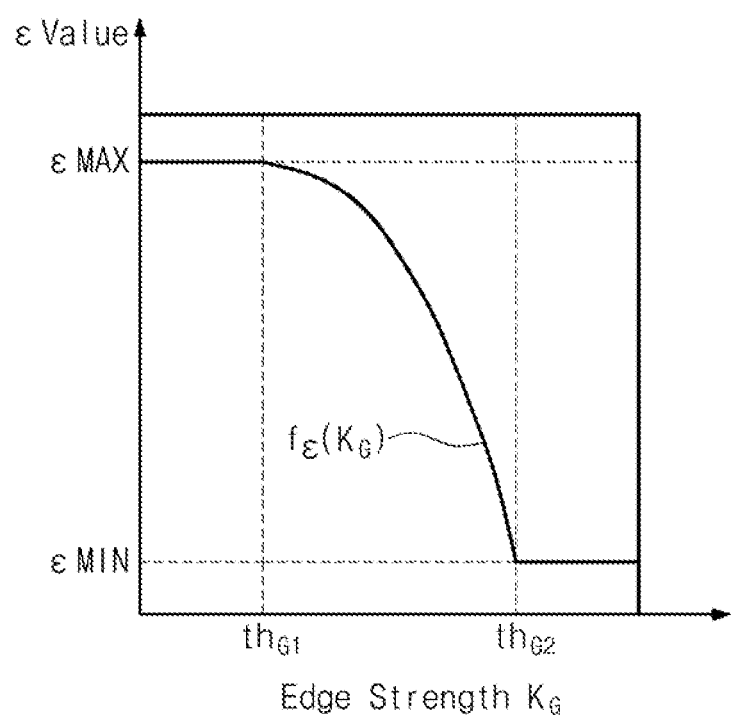
FIG. 14 illustrates another exemplary function for setting the ϵ value by the ϵ value adjusting unit based on the edge strength KG.

Furthermore, the function f$\epsilon$(KG) of FIG. 12 is a non-limiting example, and the $\epsilon$ value adjusting unit 135 according to an embodiment may apply the function f$\epsilon$(KG) of FIG. 13 to the edge strength KG calculated from the stairs tone strength KS and the gradient $\nabla$ for each pixel of interest. For another example, the $\epsilon$ value adjusting unit 135 may apply the function f$\epsilon$(KG) of FIG. 14 to the edge strength KG calculated from the stairs tone strength KS and the gradient $\nabla$ for each pixel of interest, to perform edge strength–$\epsilon$ value conversion. FIG. 14 illustrates another example of the function f$\epsilon$(KG) for setting, by the $\epsilon$ value adjusting unit 135, the $\epsilon$ value based on the edge strength KG, i.e., for performing edge strength–$\epsilon$ value conversion.

As described above, the $\epsilon$ value adjusting unit 135 sets the $\epsilon$ value for each pixel of interest based on the edge strength KG calculated for each pixel of interest in an input image, and outputs the $\epsilon$ value to the smoothing processor 11.

The following process is the same as that described above with respect to the illumination light generation unit 10' according to a comparative example. That is, the smoothing processor 11 receives, from the $\epsilon$ value adjusting unit 135, the $\epsilon$ value calculated for each pixel of interest in an input image, and applies an $\epsilon$ filter to the pixel of interest and to adjacent pixels based on the acquired $\epsilon$ value. As described above, the smoothing processor 11 performs a smoothing operation by applying the $\epsilon$ filter to the input II, and outputs a brightness component that results from the smoothing operation as the illumination light component LL.

As described above, the illumination light generation unit 10 according to an embodiment calculates the gradient $\nabla$ and the variance $\sigma^2$ or standard deviation $\sigma$ for each pixel of interest, and calculates the stairs tone strength KS based on differences between the gradient $\nabla$ and the variance $\sigma^2$. Furthermore, the illumination light generation unit 10 calculates the edge strength KG from the stairs tone strength KS and the gradient $\nabla$, and adjusts the $\epsilon$ value based on the edge strength KG. As described above, the edge strength KG has a high value for a stairs edge portion and a low value for other portions, including pattern tone edge portions. Therefore, the illumination light generation unit 10 can differentiate a stairs tone edge from a pattern tone edge in an input image. For example, nonlinear smoothing can be performed that decreases the smoothing effect for a stairs tone edge and increases the smoothing effect for other portions, such as pattern tone edges. In addition, in the illumination light generation unit 10 according to an embodiment, the gradient $\nabla$ calculated for each pixel of interest may be a "first parameter", and the variance $\sigma^2$ or standard deviation $\sigma$ may be a "second parameter".

2.3. Processing

Figure 15:
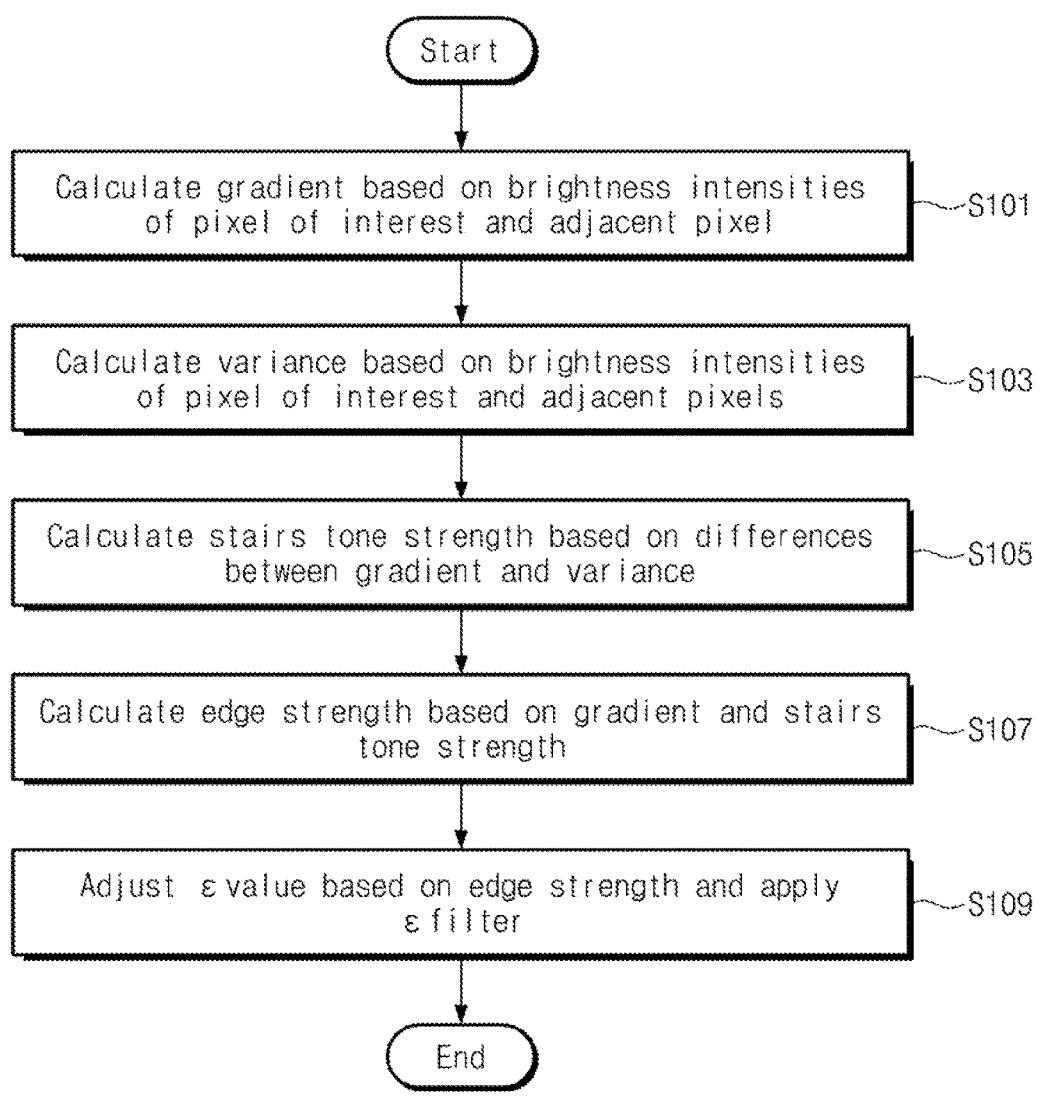
FIG. 15 is a flowchart of a process flow of an illumination light generation unit according to an embodiment.

A process flow of the illumination light generation unit 10 according to an embodiment will be described with reference to FIG. 15. FIG. 15 is a flowchart that illustrates a process flow of the illumination light generation unit 10 according to an embodiment.

Operation S101

In operation S101, the gradient calculation unit 131 calculates the gradient $\nabla$ for each pixel of interest from brightness intensities of pixels adjacent to the pixel of interest, wherein each pixel of an input image II is sequentially processed as the pixel of interest. Furthermore, the gradient calculation unit 131 may calculate the gradient $\nabla$ for each pixel of interest by calculating a convolution integral using a filter operator. The gradient $\nabla$ may be calculated from any one of Equations (2) and (3). Furthermore, the gradient calculation unit 131 outputs, to the $\epsilon$ value adjusting unit 135, the gradient $\nabla$ calculated for each pixel of interest.

Operation S103

In operation S103, the variance calculation unit 133 calculates the variance $\sigma^2$ for each pixel of interest from brightness intensities of the pixel of interest and pixels adjacent to the pixel of interest, wherein each pixel of an input image II is sequentially processed as the pixel of interest. The variance $\sigma^2$ may be calculated from Equation (8). Furthermore, the variance calculation unit 133 outputs, to the $\epsilon$ value adjusting unit 135, the variance $\sigma^2$ calculated for each pixel of interest.

Operation S105

In operation S105, the $\epsilon$ value adjusting unit 135 receives, from the gradient calculation unit 131, the gradient $\nabla$ calculated for each pixel of interest, and, from the variance calculation unit 133, the variance $\sigma^2$ calculated for each pixel of interest. The $\epsilon$ value adjusting unit 135 calculates the stairs tone strength KS for each pixel of interest based on differences between the gradient $\nabla$ and the standard deviation $\sigma$. The stairs tone strength KS may be calculated from any one of Equations (10), (12) and (14).

Operation S107

Thereafter, in operation S107, the $\epsilon$ value adjusting unit 135 calculates, for each pixel of interest, the edge strength KG from the gradient $\nabla$ for the pixel of interest and the stairs tone strength KS for the pixel of interest. The edge strength KG may be calculated from any one of Equations (16) and (17).

Operation S109

Once the edge strength KG is calculated for each pixel of interest, in operation S109, the $\epsilon$ value adjusting unit 135 compares the edge strength KG with a predetermined threshold value thG for each pixel of interest, and sets the $\epsilon$ value for the pixel of interest based on the comparison result. As a specific example, based on the function f$\epsilon$(KG) of FIG. 12, the $\epsilon$ value adjusting unit 135 sets the $\epsilon$ value to the minimum value $\epsilon$MIN for a pixel for which the edge strength KG exceeds the threshold value thG, and sets the $\epsilon$ value to the maximum value $\epsilon$MAX for a pixel for which the edge strength KG is less than or equal to the threshold value thG.

As described above, the $\epsilon$ value adjusting unit 135 sets the $\epsilon$ value for each pixel of interest based on the edge strength KG calculated for each pixel of interest in an input image, and outputs the $\epsilon$ value to the smoothing processor 11.

The smoothing processor 11 receives, from the $\epsilon$ value adjusting unit 135, the $\epsilon$ value calculated for each pixel of interest in an input image, and applies an ε filter to the pixel of interest and to adjacent pixels based on the ε value. As described above, the smoothing processor 11 performs a smoothing operation by applying the ε filter to the input II, and outputs a brightness component that results from the smoothing operation as the illumination light component LL.

An exemplary image processing method may include the above-mentioned series of operations in which the edge strength KG is calculated from the stairs tone strength KS indicative of differences between the gradient ∇ and the variance $\sigma^2$, and a smoothing operation performed on the input image based on the ε value set based on the edge strength KG.

The above-mentioned series of operations may be configured as a program for being executed on a CPU of a device that operates each element of the illumination light generation unit 10. This program may be configured to be executed by an operating system (OS) installed in the device. A storage location of the program is not limited if it is readable by a device that includes the elements for performing the above-mentioned processing. For example, the program may be stored in a external recording medium accessible from the device. In this case, the recording medium in which the program is stored may be accessed by the device so that a CPU of the device can execute the program.

3. Modification Example

A modification of the illumination light generation unit 10 according to an embodiment will be described. The illumination light generation unit 10 according to a modification example differs from the above-mentioned illumination light generation unit 10 of FIG. 7 with respect to an ε value generation unit 15. Therefore, in the following description, a configuration and operation of the ε value generation unit of the illumination light generation unit 10 according to the modification example are particularly described.

3.1. Configuration of ε Value Generation Unit

Figure 16:
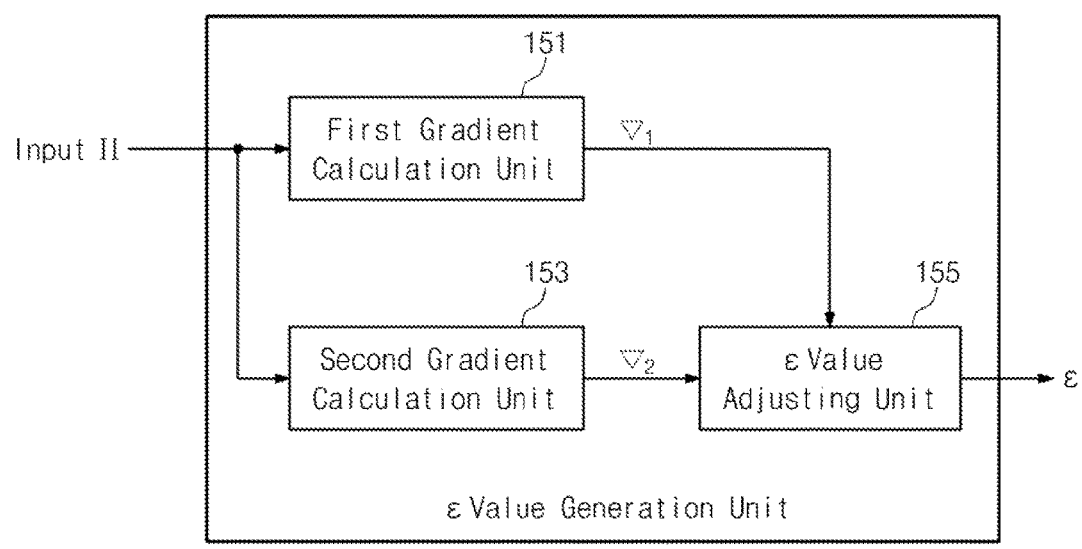
FIG. 16 is a block diagram of an exemplary configuration of an ϵ value generation unit according to a modification example.

An exemplary configuration of the ε value generation unit 15 according to a modification example will be described with reference to FIG. 16. FIG. 16 is a block diagram of an exemplary configuration of the ε value generation unit 15 according to a modification example.

The ε value generation unit 13 described above with regard to FIG. 7 calculates the gradient ∇ and the variance $\sigma^2$ for each pixel of interest in an input image, and calculates the edge strength KG based on the stairs tone strength KS indicative of the differences between the gradient ∇ and the variance $\sigma^2$. The ε value generation unit 15 according to a modification example differs from the ε value generation unit 13 in that the former calculates, for each pixel of interest of an input image, gradients ∇1 and ∇2 based on operators of different lengths. That is, gradients ∇1 and ∇2 have different ranges in which a pixel is adjacent to the pixel of interest, or, in other words, different pass frequency bands. The ε generation unit 15 calculates the edge strength KG based on the stairs tone strength KS, which is indicative of the differences between the gradients ∇1 and ∇2.

In detail, as illustrated in FIG. 16, the ε value generation unit 15 according to a modification example includes a first gradient calculation unit 151, a second gradient calculation unit 153, and an ε value adjusting unit 155.

The first gradient calculation unit 151 calculates a first gradient ∇1 based on brightness intensities of pixels adjacent to a pixel of interest, wherein each pixel of an input image II is sequentially processed as the pixel of interest. Likewise, the second gradient calculation unit 153 calculates a second gradient ∇2 based on brightness intensities of pixels adjacent to a pixel of interest, wherein each pixel of an input image II is sequentially processed as the pixel of interest.

Each of the first and second gradient calculation units 151 and 153 may calculate a gradient in the same way as the gradient calculation unit 131 described above with respect to FIG. 7.

Letting an operator length for calculating the first gradient ∇1 by the first gradient calculation unit 151 be n, and an operator length for calculating the second gradient ∇2 by the second gradient calculation unit 153 be m, the operator lengths n and m may be set such that m>n.

In detail, the gradients ∇1 and ∇2 may be calculated using a band limiting filter having a smoothing effect as described above with respect to Equation (3). Here, a passband of the second gradient ∇2 may be wider towards a low band side than a passband of the first gradient ∇1. The first gradient ∇1 may be calculated using a high pass filter as described above with respect to Equation (2). The passband of the first gradient ∇1 corresponds to a first pass frequency range, and the passband of the second gradient ∇2 corresponds to a second pass frequency range.

Since each of the first and second gradients ∇1 and ∇2 is calculated in this manner, an absolute value of the first gradient ∇1 is included in an absolute value of the second gradient ∇2 for a stairs tone edge. For a pattern tone edge, the absolute value of the first gradient ∇1 is substantially included in the absolute value of the second gradient ∇2, but an amplitude of the first gradient ∇1 rapidly changes with respect to the second gradient ∇2, based on the edge strength of the pattern tone edge. By virtue of such characteristics of the gradients ∇1 and ∇2, the ε value adjusting unit 155 calculates the edge strength KG from the stairs tone strength KS indicative of the differences between the first and second gradients ∇1 and ∇2.

The first gradient ∇1 has a first range of n pixels adjacent to the pixel of interest, where n is an operator length. Furthermore, the second gradient ∇2 has a second range of m (m>n) pixels adjacent to the pixel of interest, wherein m is an operator length.

As described above, the first gradient calculation unit 151 calculates the first gradient ∇1 for each pixel of interest, and outputs the calculated first gradient ∇1 to the ε value adjusting unit 155. Likewise, the second gradient calculation unit 153 calculates the second gradient ∇2 for each pixel of interest, and outputs the calculated second gradient ∇2 to the ε value adjusting unit 155.

The ε value adjusting unit 155 receives, from the first gradient calculation unit 151, the first gradient ∇1 calculated for each pixel of interest. Furthermore, the ε value adjusting unit 155 receives, from the second gradient calculation unit 153, the second gradient ∇2 calculated for each pixel of interest.

The ε value adjusting unit 155 calculates the stairs tone strength KS, which indicates the differences between the first and second gradients ∇1 and ∇2. For example, letting the coordinates of a pixel of interest be (x, y), the stairs tone strength KS(x, y) for the pixel of interest can be calculated based on a ratio of the first gradient ∇1(x, y) to the second gradient ∇2(x, y) for the pixel of interest as expressed by Equation (18) below.

$$K_S(x, y) = \frac{|\nabla_1 (x, y)|}{|\nabla_2 (x, y)|} \tag{18}$$

By generalizing Equation (18), the stairs tone strength KS can be expressed as Equation (19) below.

$$K_S = \frac{|\nabla_1|}{|\nabla_2|} \quad (19)$$

As another example, the ϵ value adjusting unit 155 may calculate the stairs tone strength KS based on differences of the magnitudes of the first and second gradients ∇1 and ∇2. In this case, letting the coordinates of a pixel of interest be (x, y), the stairs tone strength KS(x, y) of the pixel of interest can be calculated based on the first gradient ∇1(x, y) and the second gradient ∇2(x, y) of the pixel of interest as expressed by Equation (20) below.

$$K_S(x, y) = |\nabla_2(x, y)| - |\nabla_1(x, y)| \quad (20)$$

By generalizing Equation (20), the stairs tone strength KS can be expressed as Equation (21) below.

$$K_S = |\nabla_2| - |\nabla_1| \quad (21)$$

As described above, the ϵ value adjusting unit 155 calculates the stairs tone strength KS based on differences between the first and second gradients ∇1 and ∇2.

The following process is the same as that described above with respect to the ϵ value adjusting unit 135. That is, the ϵ value adjusting unit 155 calculates, for each pixel of interest in an input image, the edge strength KG based on the first gradient ∇1 of the pixel of interest and the stairs tone strength KS of the pixel of interest. The edge strength KG may be calculated from any one of Equations (16) and (17).

The ϵ value adjusting unit 155 compares the edge strength KG calculated for each pixel of interest with the predetermined threshold value thG, and sets the ϵ value based on the comparison result. The ϵ value adjusting unit 155 may use, for example, the function fϵ(KG) of FIG. 12 to set the ϵ value based on the edge strength KG, to perform edge strength–ϵ value conversion. Alternatively, like the ϵ value adjusting unit 135, the ϵ value adjusting unit 155 may use the function fϵ(KG) of FIG. 13 or the function fϵ(KG) of FIG. 14 to perform edge strength–ϵ value conversion.

As described above, the ϵ value adjusting unit 155 sets the ϵ value for each pixel of interest based on the edge strength KG calculated for each pixel of interest in an input image, and outputs the ϵ value to the smoothing processor 11.

The smoothing processor 11 receives, from the ϵ value adjusting unit 155, the ϵ value calculated for each pixel of interest in an input image, and applies an ϵ filter based on the acquired ϵ value to the pixel of interest and pixels adjacent thereto. As described above, the smoothing processor 11 performs a smoothing operation by applying the ϵ filter to the input II, and outputs a brightness component that results from the smoothing operation as the illumination light component LL.

As described above, the illumination light generation unit 10 according to a modification example can calculate gradients ∇1 and ∇2 for each pixel of interest based on operators of different operator lengths to acquire the first and second gradients ∇1 and ∇2 having different passbands, and can calculate the stairs tone strength KS based on the differences between the gradients ∇1 and ∇2. Furthermore, the illumination light generation unit 10 can calculate, for each pixel of interest, the edge strength KG based on the stairs tone strength KS and the first gradient ∇1, and can adjust the ϵ value based on the edge strength KG. By virtue of such a configuration, the illumination light generation unit 10 according to a modification example can differentiate a stairs tone edge from a pattern tone edge in an input image. For example, nonlinear smoothing may be performed that decreases smoothing for a stairs tone edge and increases smoothing for other portions, including a pattern tone edge. In addition, in the illumination light generation unit 10 according to a modification example, the first gradient ∇1 calculated for each pixel of interest may be a first parameter, and the second gradient ∇2 may be a second parameter.

3.2. Processing

Figure 17:
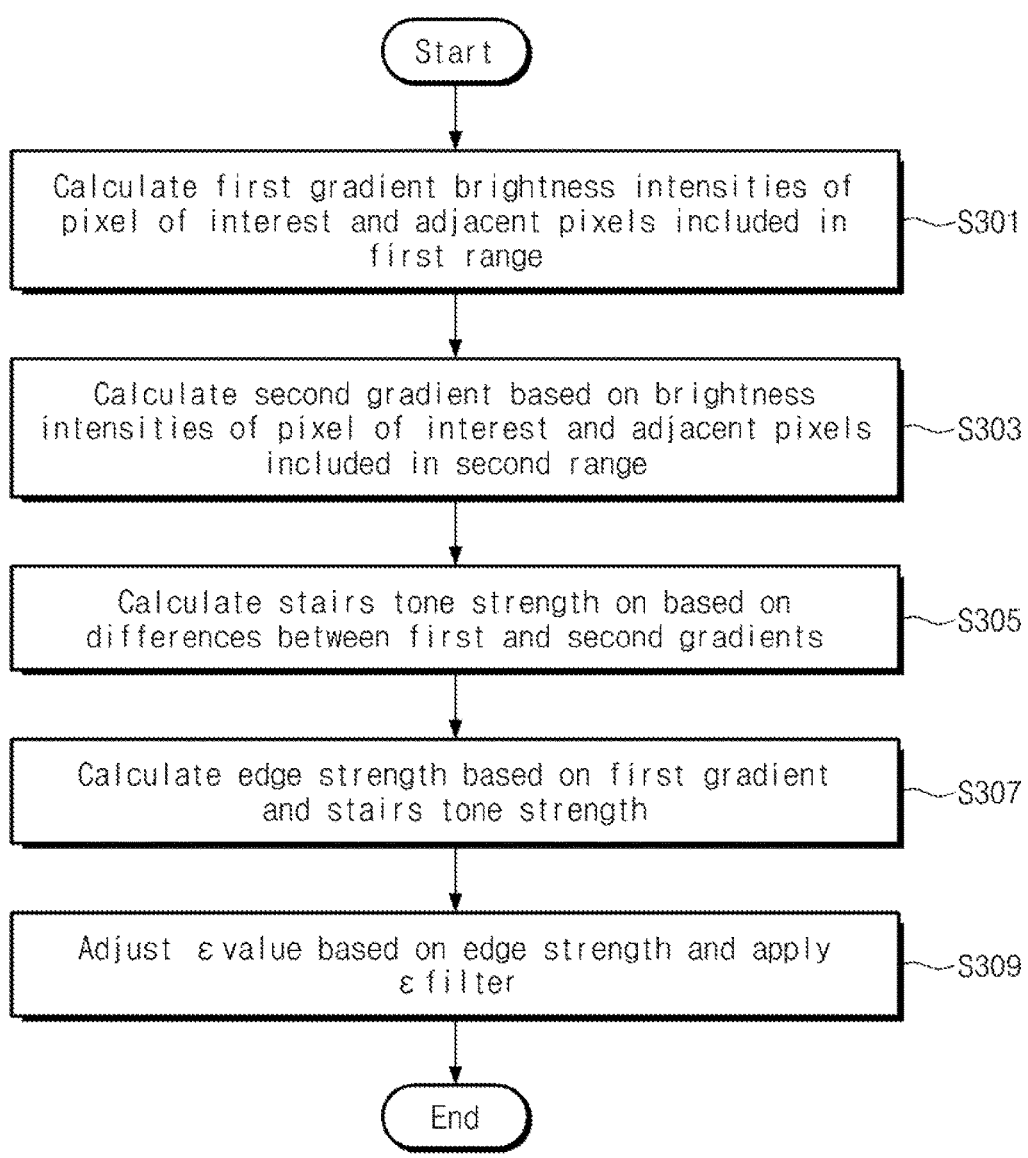
FIG. 17 is a flowchart of a process flow of an illumination light generation unit according to a modification example.

A process flow of the illumination light generation unit 10 according to a modification example will be described with reference to FIG. 17. FIG. 17 is a flowchart of a process flow of the illumination light generation unit 10 according to a modification example.

Operation S301

In operation S301, the first gradient calculation unit 151 calculates the first gradient ∇1 for each pixel of interest based on brightness intensities of pixels adjacent to the pixel of interest, based on an operator of length of n with respect to the pixel of interest, wherein each pixel in an input image II is sequentially processed as the pixel of interest. The first gradient ∇1 may be calculated using any one of a band limiting filter as described above with respect to Equation (3) or a high-pass filter as described above with respect to Equation (2). Furthermore, the first gradient calculation unit 151 outputs, to the ϵ value adjusting unit 155, the first gradient ∇1 calculated for each pixel of interest.

Operation S303

In operation S303, the second gradient calculation unit 153 calculates the second gradient ∇2 for each pixel of interest based on brightness intensities of pixels adjacent to the pixel of interest, based on an operator of length of m (m>n) with respect to the pixel of interest, wherein each pixel of an input image II is sequentially processed as the pixel of interest. The second gradient ∇2 may be calculated using a band limiting filter as described above with respect to Equation (3). Here, a passband of the second gradient ∇2 may be wider towards a low band side than a passband of the first gradient ∇1. Furthermore, the second gradient calculation unit 153 outputs, to the ϵ value adjusting unit 155, the second gradient ∇2 calculated for each pixel of interest.

Operation S305

In operation S305, the ϵ value adjusting unit 155 receives, from the first gradient calculation unit 151, the first gradient ∇1 calculated for each pixel of interest. Furthermore, the ϵ value adjusting unit 155 receives, from the second gradient calculation unit 153, the second gradient ∇2 calculated for each pixel of interest. The ϵ value adjusting unit 155 calculates the stairs tone strength KS indicative of the differences between the first and second gradients ∇1 and ∇2. The stairs tone strength KG may be calculated from any one of Equations (18) and (20).

Operation S307

Thereafter, in operation S307, the ϵ value adjusting unit 155 calculates, for each pixel of interest, the edge strength KG from the first gradient ∇1 of the pixel of interest and the stairs tone strength KS of the pixel of interest. The edge strength KG may be calculated from any one of Equations (16) and (17).

Operation S309

Once the edge strength KG is calculated for each pixel of interest, at operation s309, the ϵ value adjusting unit 155 compares the edge strength KG with the predetermined threshold value thG for each pixel of interest, and sets the ϵ value for the pixel of interest according to the comparison result. As a specific example, based on the function fϵ(KG)

of FIG. 12, the ϵ value adjusting unit 155 sets the ϵ value to the minimum value ϵMIN for a pixel for which the edge strength KG exceeds the threshold value thG, and sets the ϵ value to the maximum value ϵMAX for a pixel for which the edge strength KG is less than or equal to the threshold value thG.

As described above, the ϵ value adjusting unit 155 can set the ϵ value for each pixel of interest based on the edge strength KG calculated for each pixel of interest of an input image, and outputs the ϵ value to the smoothing processor 11.

The smoothing processor 11 receives, from the ϵ value adjusting unit 155, the ϵ value calculated for each pixel of interest of an input image, and applies an ϵ filter based on the received ϵ value to the pixel of interest and pixels adjacent thereto. As described above, the smoothing processor 11 performs a smoothing operation by applying the ϵ filter to the input II, and outputs a brightness component that results from the smoothing operation as the illumination light component LL.

3.3. Summary

As described above, the illumination light generation unit 10 according to a modification example calculates the gradients ∇1 and ∇2 for each pixel of interest based on operators having different operator lengths to acquire the first and second gradients ∇1 and ∇2 having different passbands, and calculates the stairs tone strength KS based on differences between the gradients ∇1 and ∇2. Furthermore, the illumination light generation unit 10 calculates the edge strength KG from the stairs tone strength KS and the first gradient ∇1, and adjusts the ϵ value based on the edge strength KG. By virtue of such a configuration, the illumination light generation unit 10 according to a modification example can differentiate a stairs tone edge from a pattern tone edge in an input image. For example, nonlinear smoothing can be performed to decrease smoothing for a stairs tone edge and increase smoothing for other portions, including a pattern tone edge.

The second gradient ∇2 can vary in correlation with the first gradient ∇1, but tends to be a less stable value than the variance $\sigma^2$. Therefore, as compared to a smoothing processing based on ϵ value generation by the illumination light generation unit 10 according to an above described embodiment, a smoothing processing based on ϵ value generation by the illumination light generation unit 10 according to a modification example tends to have less reduction of the edge strength of a pattern tone edge.

However, as compared to a processing based on calculating the variance $\sigma^2$, processing based on calculating the gradient ∇ requires a shorter processing time and a lower cost for configuring a circuit. That is, the illumination light generation unit 10 according to a modification example may reduce a processing time for generating the illumination light component LL and may reduce a manufacturing cost, in comparison with the illumination light generation unit 10 according to an above-described embodiment.

4. Summary

As described above, in the image processing device 1 according to an embodiment, the illumination light generation unit 10 can calculates the gradient ∇ and the variance $\sigma^2$ or standard deviation $\sigma$ for each pixel of interest, and can calculate the stairs tone strength KS based on differences between the gradient ∇ and the variance $\sigma^2$. Furthermore, the illumination light generation unit 10 can calculate the edge strength KG based on the stairs tone strength KS and the gradient ∇, and can adjust the ϵ value based on the edge strength KG. As described above, the edge strength KG has a high value for a stairs edge portion and has a low value for other portions, including a pattern tone edge portion. Therefore, the illumination light generation unit 10 according to an embodiment can differentiate a stairs tone edge from a pattern tone edge in an input image, and can perform nonlinear smoothing to decrease the smoothing effect for a stairs tone edge and increase the smoothing effect for other portions, including a pattern tone edge.

As described above, embodiments of the inventive concept provide an image processing device, an image processing method, and a program for differentiating a stairs tone edge from a pattern tone edge in an input image to perform a nonlinear smoothing operation on the image.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of embodiments of the inventive concept is to be determined by the broadest permissible interpretation of the following claims and their equivalents, and shall not be restricted or limited by the foregoing detailed description.

What is claimed is:

1. An image processing device comprising:
a generation unit that calculates an edge strength based on a stairs tone strength indicative of differences between a first parameter and a second parameter, wherein the first parameter is a first gradient based on pixel values of a pixel of interest in an input image and of adjacent pixels included in a first range with respect to the pixel of interest, the second parameter is one of a variance based on pixel values of the pixel of interest and of the adjacent pixels and a second gradient based on pixel values of adjacent pixels included in a second range wider than the first range; and
a smoothing processor that performs a nonlinear smoothing operation on the pixel values of the pixel of interest and the adjacent pixels included in the first range, based on the calculated edge strength.

2. The image processing device of claim 1, wherein the generation unit calculates the variance as the second parameter, and calculates the stairs tone strength $K_S$ based on $$K_S = k \cdot \frac{\nabla^2}{\sigma^2},$$

wherein ∇ denotes the first parameter, $\sigma^2$ denotes the second parameter, and k denotes a compensation coefficient.

3. The image processing device of claim 2, wherein the generation unit calculates the variance based on the pixel of interest and adjacent pixels included in a range wider than the first range.

4. The image processing device of claim 1, wherein the generation unit calculates a standard deviation as the second parameter based on the variance, and calculates the stairs tone strength $K_S$ based on $$K_S = k \cdot \frac{|\nabla|}{\sigma},$$

wherein ∇ denotes the first parameter, σ denotes the second parameter, and k denotes a compensation coefficient.

5. The image processing device of claim 1, wherein the generation unit calculates the variance as the second parameter, and calculates the stairs tone strength $K_S$ based on $K_S = k_\sigma \cdot \sigma^2 - k_\nabla \cdot !^2$, wherein ∇ denotes the first parameter, $σ^2$ denotes the second parameter, $k_∇$ denotes a compensation coefficient for the first parameter, and $k_σ$ denotes a compensation coefficient for the variance.

6. The image processing device of claim 1, wherein the generation unit calculates the first gradient by applying a band limiting filter having a first pass frequency range, and calculates the second gradient by applying a band limiting filter having a second pass frequency range that is wider at a lower band side than the first pass frequency range.

7. The image processing device of claim 1, wherein the generation unit calculates the second gradient as the second parameter, and calculates the stairs tone strength $K_S$ based on $$K_S = \frac{\nabla_1}{\nabla_2},$$

wherein ∇1 denotes the first parameter, and ∇2 denotes the second parameter.

8. The image processing device of claim 1, wherein the generation unit calculates the second gradient as the second parameter, and calculates the stairs tone strength $K_S$ based on $K_S = |\nabla_2| - |\nabla_1|$, wherein ∇1 denotes the first parameter, and ∇2 denotes the second parameter.

9. The image processing device of claim 1, wherein the generation unit calculates the edge strength by multiplying an absolute value of the first parameter by the stairs tone strength.

10. The image processing device of claim 1, wherein the generation unit calculates the edge strength by multiplying a square of the first parameter by the stairs tone strength.

11. The image processing device of claim 1, wherein the smoothing processor determines an ε value based on the edge strength, and performs the nonlinear smoothing operation based on an adaptive ε filter according to the ε value.

12. The image processing device of claim 11, wherein the smoothing processor determines the ε value based on a result of comparison between the edge strength and a predetermined threshold value.

13. The image processing device of claim 12, wherein the smoothing processor determines the ε value to be a minimum value if the edge strength exceeds the threshold value, and determines the ε value to be a maximum value if the edge strength is less than or equal to the threshold value.

14. An image processing method comprising:
calculating an edge strength based on a stairs tone strength indicative of differences between a first parameter and a second parameter, the first parameter being a first gradient based on pixel values of a pixel of interest in an input image and of adjacent pixels included in a first range with respect to the pixel of interest, the second parameter being one of a variance based on pixel values of the pixel of interest and the adjacent pixels and a second gradient based on pixel values of adjacent pixels included in a second range wider than the first range; and performing a nonlinear smoothing operation on the pixel values of the pixel of interest and the adjacent pixels included in the first range, based on the calculated edge strength.

15. The method of claim 14, wherein the edge strength is calculated from the first parameter and the stairs tone strength, and the method further comprises
determining an value based on the edge strength, wherein the nonlinear smoothing operation is based on an adaptive ε filter based on the ε value.

16. The method of claim 14, wherein the variance is the second parameter, and the stairs tone strength is calculated based on one of $$K_S = k \cdot \frac{\nabla^2}{\sigma^2}, K_S = k \cdot \frac{|\nabla|}{\sigma},$$

$K_S = k_\sigma \cdot \sigma^2 - k_\nabla \cdot \nabla^2$,
wherein ∇ denotes the first parameter, $σ^2$ denotes the second parameter, k denotes a compensation coefficient, $k_∇$ denotes a compensation coefficient for the first parameter, and $k_σ$ denotes a compensation coefficient for the second parameter.

17. The method claim 14, wherein the second gradient is the second parameter, and the stairs tone strength is calculated based on one of $$K_S = \frac{\nabla_1}{\nabla_2}$$

or $K_S = |\nabla_2| - |\nabla_1|$,
wherein ∇1 denotes the first parameter, and ∇2 denotes the second parameter.

18. A non-transitory recording medium for storing a program for instructing a computer to perform a method for processing an image, the method comprising:
calculating an edge strength based on a stairs tone strength indicative of differences between a first parameter and a second parameter, the first parameter being a first gradient based on pixel values of a pixel of interest in an input image and of adjacent pixels included in a first range with respect to the pixel of interest, the second parameter being one of a variance based on pixel values of the pixel of interest and of the adjacent pixels and a second gradient based on pixel values of adjacent pixels included in a second range wider than the first range; and
performing a nonlinear smoothing operation on the pixel values of the pixel of interest and of the adjacent pixels included in the first range, based on the calculated edge strength.

19. The recording medium of claim 18, wherein the edge strength is calculated from the first parameter and the stairs tone strength, and the method further comprises
determining an ε value based on the edge strength, wherein the nonlinear smoothing operation is based on an adaptive ε filter based on the ε value.

20. The recording medium of claim 18, wherein the variance is the second parameter, and the stairs tone strength is calculated based on one of $$K_S = k \cdot \frac{\nabla^2}{\sigma^2}, K_S = k \cdot \frac{|\nabla|}{\sigma},$$

or $K_S = k_\sigma \cdot \sigma^2 - k_\nabla \nabla^2$, wherein $\nabla$ denotes the first parameter, $\sigma^2$ denotes the second parameter, k denotes a compensation coefficient, $k_\nabla$ denotes a compensation coefficient for the first parameter, and $k_\sigma$ denotes a compensation coefficient for the second parameter.

\* \* \* \* \*